United States Patent
Torii

(10) Patent No.: US 6,389,446 B1
(45) Date of Patent: May 14, 2002

(54) MULTI-PROCESSOR SYSTEM EXECUTING A PLURALITY OF THREADS SIMULTANEOUSLY AND AN EXECUTION METHOD THEREFOR

(75) Inventor: Sunao Torii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/888,590

(22) Filed: Jun. 30, 1997

(30) Foreign Application Priority Data

Jul. 12, 1996 (JP) .............................................. 8-183533

(51) Int. Cl.$^7$ ................................................ G06F 9/00
(52) U.S. Cl. ...................................................... 709/100
(58) Field of Search ................................. 709/102, 100, 709/300, 106, 103; 712/215, 216, 217, 204, 226, 223

(56) References Cited

U.S. PATENT DOCUMENTS

| | | | | |
|---|---|---|---|---|
| 5,469,570 A | * | 11/1995 | Shibata ........................... | 717/4 |
| 5,621,910 A | * | 4/1997 | Nagatmatsu ................. | 712/203 |
| 5,678,016 A | * | 10/1997 | Eisn et al. ................... | 712/216 |
| 5,729,757 A | * | 3/1998 | Shekls ........................... | 712/1 |
| 5,787,272 A | * | 7/1998 | Gupta et al. ................. | 709/400 |
| 5,812,811 A | * | 9/1998 | Dubey et al. ................. | 712/216 |
| 5,867,704 A | * | 2/1999 | Tanaka et al. ............... | 709/105 |

FOREIGN PATENT DOCUMENTS

| JP | 08055092 A | * | 2/1996 | ........... G06F/15/16 |
|---|---|---|---|---|

OTHER PUBLICATIONS

Nikhil et al, "A Multithreaded Massively Parallel Architecture", Proc. of 19th Ann. Intl. Symp. on Computer Architecture, pp. 156–167, May 1992.

Culler et al, "Fine–grain Parallelism with Minimal Hardware Support: A Compiler–controlled Threaded Abstract Machine", Proc. of 4th Intl. Conf. on Architectural Sup. for Prog. Langs. & Op. Sys., pp. 164–175, Apr. 1991.

Sohi et al, "Multiscalar Processor", The 22nd Int'l Symp. on Computer Architecture, IEEE Computer Society Press, 1995, pp. 414–425.

Dubey et al, "Single Speculative Multi–Threading (SPSM) Architecture: Compiler–assisted Fine–Grained Multi–threading", Parallel Architecture and Compilation Techniques, IFIP, 1995 p. 109–121.

Culler. Culler, David E., et al. "Fine–grain Parallelism with Minimal Hardware Support: A Compiler–Controlled Threaded Abstract Machine", Sep. 1991.*

Cooper. Cooper, Eric C., et al.. "C Threads", Sep. 1990.*

Bohm. Bohm, A.P.W. et al. "An Evaluation of Bottom–Up and Top–Down Thread Generation Techniques", 1993.*

Kleiman, Steve. "Programming with Threads", Nov. 1996.*

Northcutt, J. Duane. "The Alpha Operating System: Programming Model", Feb. 15, 1988.*

Philbin, James. "An Overview of the Sting Operating System", Oct. 1992.*

* cited by examiner

Primary Examiner—St. John Courtenay, III
Assistant Examiner—Lewis A. Bullock, Jr.
(74) Attorney, Agent, or Firm—Foley & Lardner

(57) ABSTRACT

A program is divided into several instruction streams, and each of them is executed as a thread. A thread processor executed the thread. The thread generates another thread, but one thread is controlled to make a fork operation at most once. Each thread is terminated in the order of generations. A thread manager may be shared with the several thread processors or be distributed to the several thread processors. The thread manager includes a thread sequencer and a thread status table. The thread status table manages execution status of each thread processor and parent-child relation. The thread sequencer requests a thread generation and permits its termination in accordance with the content of the thread status table. The thread processor can execute a thread speculatively.

16 Claims, 24 Drawing Sheets

MULTI-PROCESSOR SYSTEM EXECUTING A PLURALITY OF THREADS SIMULTANEOUSLY AND AN EXECUTION METHOD THEREFOR

BACKGROUND OF THE INVENTION

The present invention relates to a multi-processor system executing a plurality of threads simultaneously and an execution method therefor.

Many multi-thread execution methods have been proposed for exploiting a parallelism as a program execution method, in which a program is divided into several instruction streams called "threads".

According to the aforementioned multi-thread execution method, a thread is generated by "a fork operation". The thread which executes the fork operation is referred to as "a parent thread", and a newly generated thread is referred to as "a child thread". The thread is terminated after it completes a defined operation. That is, lots of threads are forked and terminated in repeated manner in a program running process.

A thread is assigned to a thread processor. In a system with several physical thread processors, several threads can be executed at the same time, and thus the execution performance is enhanced relative to sequential processing. Moreover, by assigning several threads to each thread processor, it is possible to force a currently running thread into standby state and start another thread, in cases of a synchronization failure, a resource conflict, or a cash miss-hit occurs. Thus, possible delays caused by those events can be apparently hidden behind, and efficiency of resource uses can be enhanced.

The following typical references describe a method of multi-thread execution:

1. R. S. Nikhil et al: "A Multithreaded Massively Parallel Architecture" (Proceedings of the 19th Annual International Symposium on Computer Architecture, pp.156–167, May 1992); and
2. D. E. Culler et al: "Fine-grain Parallelism with Minimal Hardware Support: A Compiler-controlled Threaded Abstract Machine" (Proceeding of Fourth International Conference on Architectural Support for Programming Languages and Operating System, pp.164–175, April 1991).

However, when the frequency of the operation of thread generation/termination and change/restoration into/from a standby-state is higher than that of the other processes, the efficiency of entire system depends on that in thread scheduling of thread generation/termination, change/restoration into/from a standby-state and so on. Therefore, it is important for efficient parallel processing to decrease the overhead relevant to the thread scheduling. In a program with less parallelism, processing amount for one thread may be small. In this case, thread execution cost and thread scheduling cost become severe.

On the other hand, thread executing methods, in which a fine grain of thread is dealt small processing amount, and apparatus thereof have been proposed. For example, one of the parallel processors using fine grains of thread has been introduced in 'Gurinder S. Sohi et al: "Multiscalar Processor" (The 22nd International Symposium on Computer Architecture, IEEE Computer Society Press, 1995, pp.414–425)'. In the multiscalar processor given in the reference, one program is divided into tasks each as a set of elementary blocks, and a processor, which has capability of parallel-processing, processes them.

FIG. 23 gives a configuration example of the multiscalar processor. The multiscalar processor has sequencer 73, processing unit 74, arbitration network 75 and data banks 76. Several processing units 74 are included in the system. Each of the processing units 74 has command cache 77, execution unit 78 and register file 79. Several data banks 76 exist, according to each of processing units 74. Each of data banks 76 is made up of ARB (Address Resolution Buffer) 80, data cache 81 and so on. The parallel operation control of several tasks is dynamically or statically made by sequencer 73 using task descriptors, which include control flow information, and each processing unit 74 is assigned to a task. When sequencer 73 assigns tasks to processing units 74, it examines the task descriptors so that next task will be assigned.

Further, a similar method of thread execution is given in the following reference: 'Pradeep K. Dubey et al: "Single Speculative Multi-threading (SPSM) Architecture: Compiler-assisted Fine-Grained Multi-threading" (Parallel Architecture and Compilation Techniques, IFIP 1995).

FIG. 24 shows a general idea on thread execution in SPSM architecture. With reference to FIG. 24, thread generation command 84 and thread queuing command 85 are both embedded in a single program 82. When thread generation command 84 is executed, future thread 83, which will execute in a forestalled manner, is generated. Future thread 83 executes until thread queuing command 85, and queues until an original process execution catches up with the future thread execution, and then merges the result from future thread execution with that from the original process execution. Future thread 83, which executes in parallel to the original process execution, is generated for the speed-up of the program execution.

However, in the aforementioned thread execution method, when a fork command is executed or a thread execution is started, and when no thread processor in standby-state exists, a thread can not be generated, and proper program execution may not be encountered. Moreover, even though thread generation is stopped until a thread processor becomes ready, new thread generations continue to be made from running threads. Thus, there are shortcomings such as an increase in the number of threads. Furthermore, information on corresponding relation among threads needs to be stored, and thread management must be performed in one place in a parallel system. Thus, there are shortcomings in that the number of thread processors is limited by constraint in the thread manager, and it is difficult to develop the thread manager by hardware because the thread management method itself is complex.

SUMMARY OF THE INVENTION

In view of the foregoing problem of the conventional system, an object of the present invention is to provide a thread execution method which lowers thread scheduling cost.

In a multi-processor system according to a first aspect of the present invention, the multi-processor system executes a plurality of threads of instruction streams. The threads are provided by dividing a program into the instruction streams. Each of the threads is controlled to generate at most one thread.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENTS

A multi-processor system in accordance with preferred embodiments of the present invention will be described in detail with reference to the accompanying drawings.

In all embodiments according to the present invention, it is assumed that the thread related processing is designated by special instructions of a processor. For example, the thread related processing includes a fork operation for generating a thread, a termination operation, a thread execution operation (e.g., speculative execution). Moreover, the present invention is not limited in embodiments, which will be detailed later. Moreover, it is needless to say, but those skilled in the art must be able to practice the present invention using many apparently widely different methods of the present invention without departing from the spirit and scope thereof.

Figure 1:
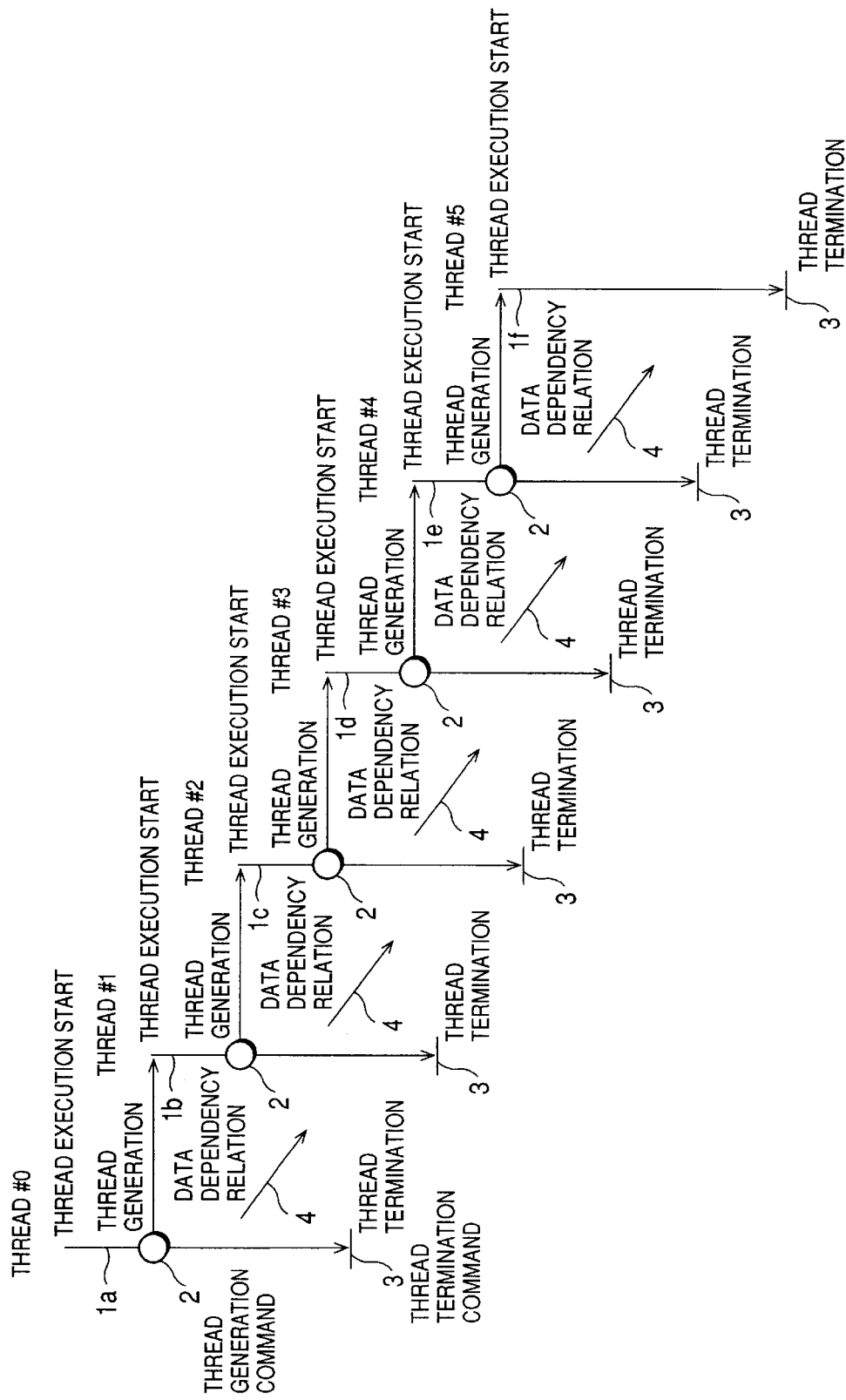
FIG. 1 is a figure to describe a multi-thread execution method of a first embodiment according to the present invention.

Referring to FIG. 1, in a first embodiment of the present invention, a thread generation instruction 2 generates a new thread from one thread. A thread termination instruction 3 terminates the execution of the thread generated by thread generation instruction 2. In this embodiment, the number of execution of thread generation instruction 2 is limited at most once in one thread. Moreover, a thread is controlled to terminate self execution in the same order as the thread generation order. With the aforementioned processing, threads to be assigned to thread processors #0 though #3 can be statically scheduled.

For example, a thread generation instruction 2 generates thread #1 (1b) from thread #0 (1a). A thread termination instruction 3 forces the execution of thread #0 (1a) to terminate. Another thread generation instruction 2 generates thread #2 (1c) from thread #1 (1b). Another thread termination instruction 3 terminates the execution of thread #1 (1b). Further another thread generation instruction 2 generates thread #3 (1d) from thread #2 (1c). Further another thread termination instruction 3 forces the execution of thread #2 (1c) to terminate. In the same manner, after thread #4 (1e) is generated from thread #3 (1d), the execution of thread #3 (1d) terminates.

Here, the parent thread of thread #1 (1b) is thread #0 (1a) while the child thread of thread #1 (1b) is thread #2 (1c). When between threads is data-dependency relation 4, the dependency exists only in the direction from a parent thread to a child thread. Synchronization among threads is needed to take a timing between dependent data production and consumption. Moreover, the execution of thread termination instruction 3 in the child thread is stalled until the parent thread's termination by the execution of thread termination instruction 3 in the parent thread so that thread termination instruction 3 of the parent thread is executed earlier than that of the child thread.

Figure 2:
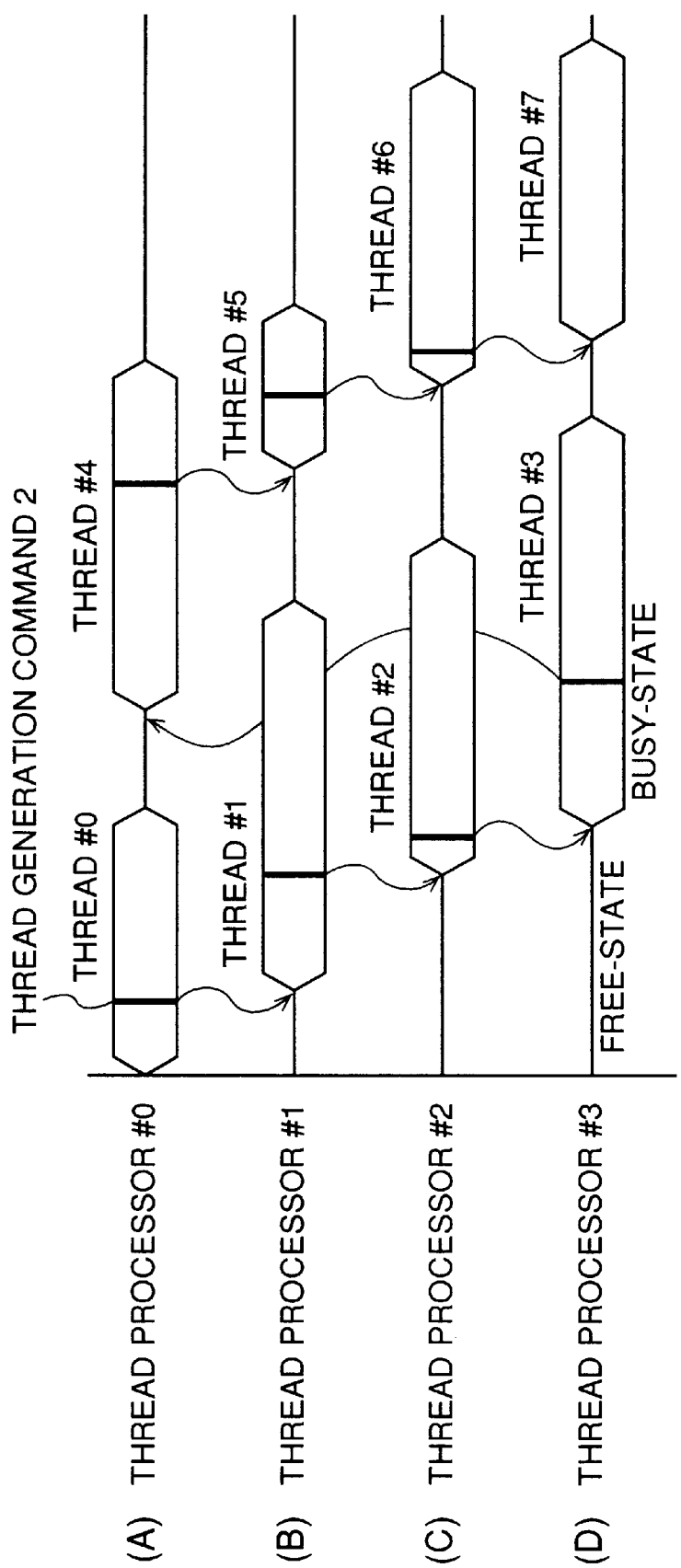
FIG. 2 is a timing chart to describe the operation of a multi-thread execution method shown in FIG. 1.

FIG. 2 is a timing chart when 4 thread processors #0, #1, #2 and #3 in a parallel processing system perform parallel processing according to the aforementioned multi-thread execution method. Referring to FIG.1 and FIG. 2, when thread processor #0 executes a thread generation instruction 2 in thread #0, thread processor #0 generates new thread #1 to provide thread #1 to thread processor #1. When thread processor #1 executes a thread generation instruction 2 in thread #1, thread #2 is generated to provide thread #2 to thread processor #2. Thread #1 does not terminate before the termination of thread #0. In the same manner, thread #2 does not terminate before the termination of thread #1.

As described earlier, in the first embodiment according to the present invention, the number of execution of a thread generation instruction 2 is limited at most once in one thread, and the thread is terminated in the same order as thread generation order. Thus, threads assigned to threads #0 through #3 can be statically scheduled. Further, when a thread processor executes a thread generation instruction 2, and when no another thread processor, which currently does not execute any thread (e.g., in a "free" state), exists, said thread processor stalls the execution of the thread generation instruction until a thread processor becomes available (i.e. it enters a "free" state).

Next, an example of thread generation operation according to the multi-thread execution method will be described. Here, the following loop program is taken into consideration. In this program, it is assumed that there is no delayed branch for a branch instruction, in order to clearly understand the point of the thread generation operation. As for notations in the following process, the numerals 40f040, 40f044, . . . , 40f054 in the left column denote execution addresses in the program. Symbols in the middle column denote mnemonic codes. The right column is for operands according to the mnemonic codes. The program loops until register r1 becomes "0", and calls the subroutine designated in the address of "0x40f044" (where '0x' is a prefix signifying a hexadecimal number).

40f040: addu r4, r14, r18
; r4+r14→r18 (unsigned addition)

40f044: jal 0x40e99c <0x40e99c>
; subroutine call (its return address is
; stored in register ra)

40f048: addiu r17, r17, 0x8
; r17+0x8→r17
; (unsigned addition immediate)

40f04c: slti r1, r17, 0x40
; if r17 is less than "0x40"
; then r1 is set to "1"

40f050: sll r14, r17, 1
; r17 is logically shifted by one bit
; to the left

40f054: bne r1, r0, −0x18 <0x40f040>
; if r1 is not equal to r0
; then the process jumps
; to the address of 0x40f40

In what follows, an example of program is given using multi-threads according to the aforementioned program, in which one loop is defined as one thread.

40f040: fork 0x10 <0x40f050>
40f044: addu r4, r14, r18
40f048: jal 0x40e99c <0x40e99c>
40f04c: term
40f050: addiu r17, r17, 0x8
40f054: slti r1, r17, 0x40
40f058: sll r14, r17, 1
40f05c: bne r1, r0, −0x20 <0x40f040>

In this example (subroutine) program, the following premises are made: the thread generation instruction is defined as "a fork instruction" while the thread termination instruction is defined as "a term instruction"; write addresses for a memory do not conflict each other in the subroutine; and a thread generation is not made in the subroutine.

As described above, according to the first embodiment of the present invention, statically scheduling of each thread is allowed. Moreover, the number of current threads does not exceed that of thread processors. Thus, an upper limit of the number of threads is always guaranteed, and effective thread management can be made.

Next, a second embodiment of the present invention will be detailed with reference to the accompanying figures.

Figure 3:
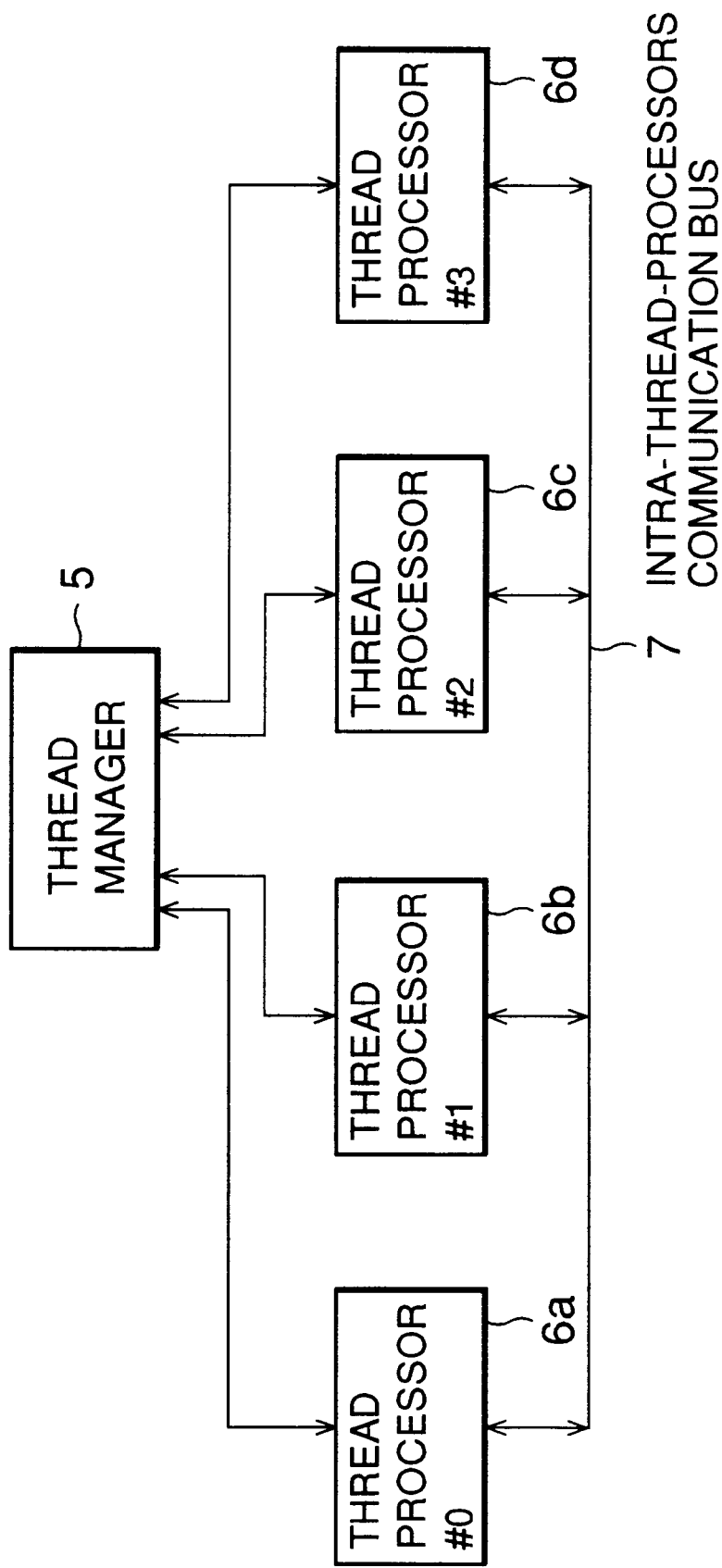
FIG. 3 shows a processor configuration performing a multi-thread execution method of a second embodiment according to the present invention.

FIG. 3 shows the configuration of a processor for performing a multi-thread execution method of the second embodiment according to the present invention. The processor shown in FIG. 3 has four thread processors.

Referring to FIG. 3, thread processors #0 (6*a*), #1 (6*b*), #2 (6*c*) and #3 (6*d*) are connected to thread manager 5, being connected through intra-thread-processors communication bus 7.

Figure 4:
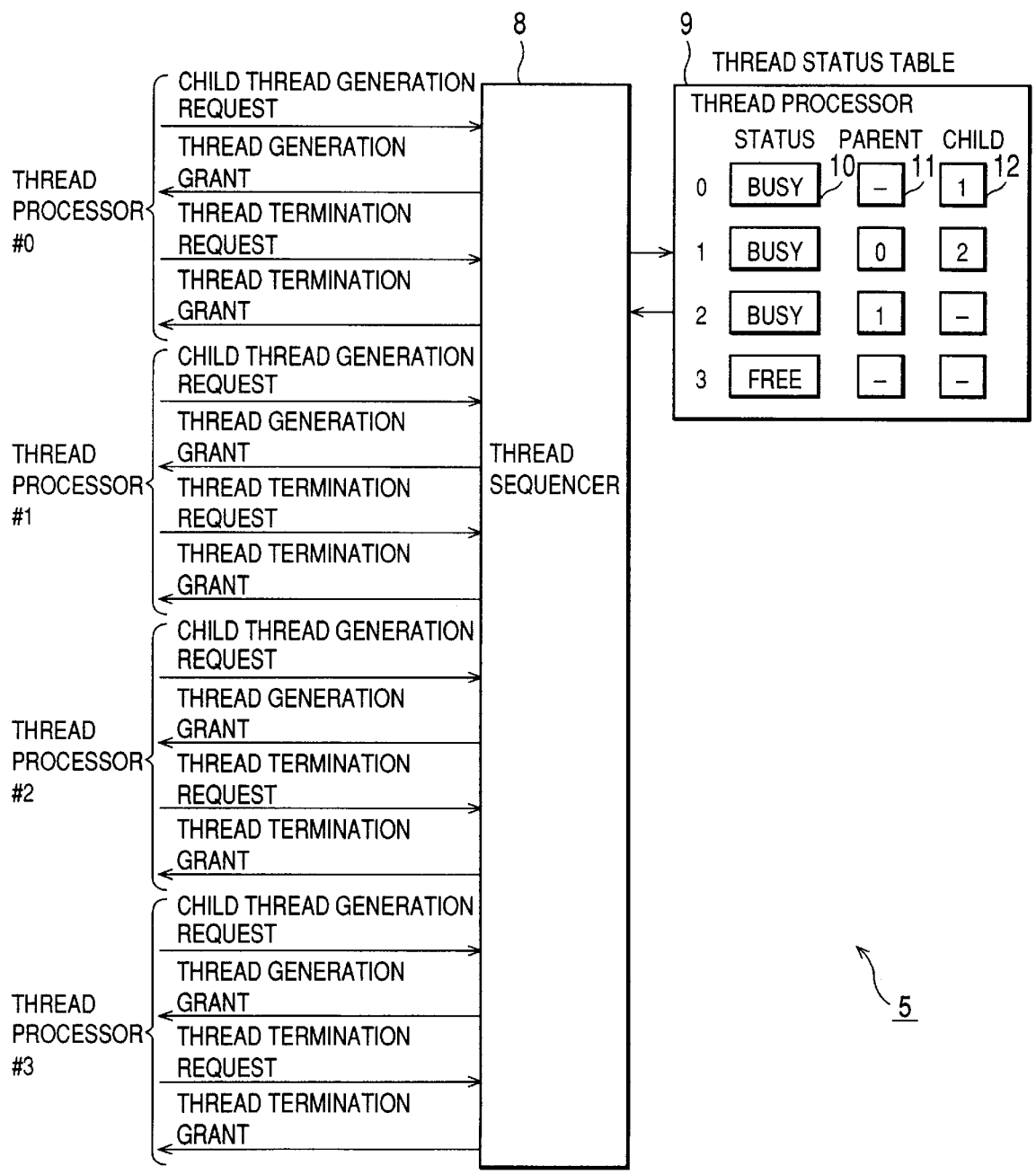
FIG. 4 shows a configuration of a thread manager in the processor shown in FIG. 3.

FIG. 4 gives the detail configuration of thread manager 5. Thread manager 5 includes thread sequencer 8 and thread status table 9. Thread status table 9 has entries for the number of thread processors 6. Each entry for thread processors #0 through #3 (6*a* through 6*d*) includes thread status entry 10, parent thread processor number entry 11, and child thread processor number entry 12. Thread status entry 10 indicates the operation status (e.g, "busy"/"free" state) of corresponding thread processor. Parent thread processor number entries 11 and child thread processor number entries 12 indicate numbers of thread processors executing a parent and child thread.

Next, the operation of thread manager 5 when a thread is generated or a thread is terminated in the second embodiment, will be described. The operation is controlled mainly according to the state transition of thread sequencer 8.

Figure 5:
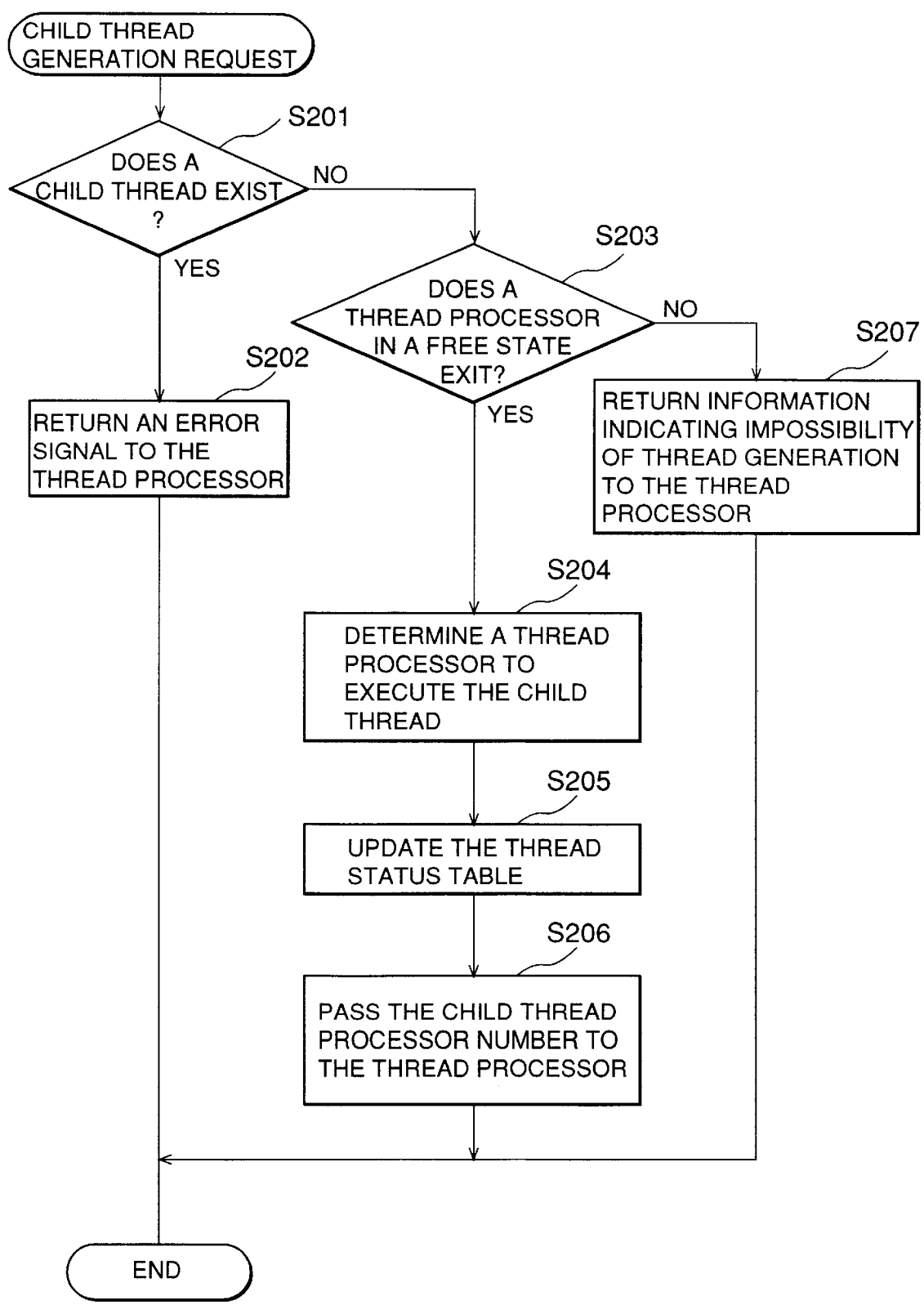
FIG. 5 is a flowchart to describe the operation when a thread is generated by a thread sequencer in the thread manager shown in FIG. 4.

FIG. 5 is a flowchart showing an algorithm at thread generation by thread sequencer 8.

Referring to FIG. 3 through FIG. 5, to begin with, one of thread processors #0 through #3 (6*a* through 6*d*) executes thread generation instruction 2 to ask thread manager 5 to generate a child thread. When thread manager 5 receives the request of the child thread generation, it determines whether the thread being executed by the one of thread processors #0 through #3 (6*a* through 6*d*) has already generated another thread (step S201). It is determined by checking the content of child thread processor entry number 12 in thread status table 9.

In step S201, if it is determined that a thread has been already generated, a thread generation is not needed, and an error signal is returned to the one of thread processors #0 through #3 (6*a* through 6*d*) (step S202). On the other hand, if a thread has yet to been generated, it is determined whether a thread processor in a free state exists (step S203). It is determined by checking the content of thread status entry 10 in thread status table 9.

In step S203, if no thread processor in a free state exist, information indicating impossibility of thread generation is returned to the thread processor which requested thread generation (step S207). The thread processor that received this information either waits until another thread processor enter a "free" state or performs saving internal status or so on (e.g., register values at thread execution start and a thread execution restart address).

Further, the saving process can be realized using a firmware, an operating system or the like. There are waiting methods until entering a "free" state in that thread processors inquiry at fixed periods or thread manager 5 notifies to thread processors.

In step S203, when thread processors in a "free" state exists, determination of which thread processor is selected for the child thread is made (step S204). For example, thread status table 9 is searched for a "free"-state thread processor to have the first found "free"-state thread processor execute. Then, thread status table 9 is updated (step S205). At this update, thread status entry 10 of newly selected thread processor which will execute the child thread is updated from the "free" state to a busy state, and parent thread processor number entry 11 is set to the number of newly selected thread processor which has made the thread generation request. Moreover, child thread processor number entry 12 of the thread processor which has made the thread generation request, is set. When the update of thread status table 9 is finished, the number of the child thread processor is passed to the thread processor which made the thread generation request (step S206). The thread processor which received this information sends takeover information (e.g., data to be taken over and a thread start address) to the child thread processor through intra-thread-processors communication bus 7. Thereby, the child thread is allowed to be executed.

Figure 6:
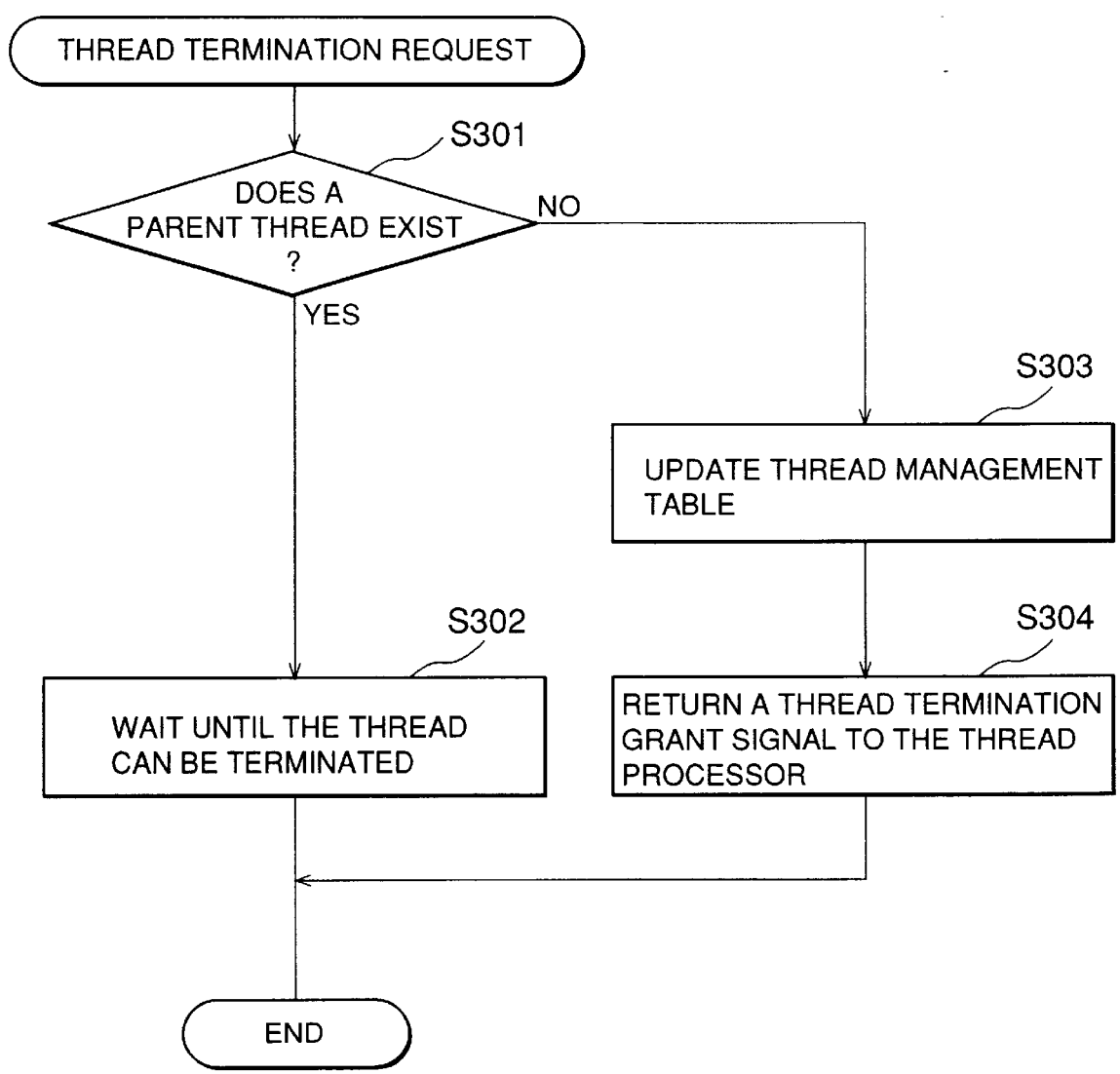
FIG. 6 is a flowchart to describe when a thread is terminated by a thread sequencer in the thread manager shown in FIG. 4.

FIG. 6 shows the operation of thread sequencer 8 when a thread is terminated.

Referring to FIGS. 3, 4 and 6, as for a thread termination, a child thread is not terminated as long as its parent thread has not yet terminated (step S301), so that it is guaranteed that the thread termination order accords with corresponding thread generation order. The termination of a parent thread is determined by whether or not parent thread processor number entry 11 in thread status table 9 is cleared. If entry 11 is not cleared, corresponding thread processor is in a waiting state (step S302). On the other hand, if entry 11 is cleared, thread status entry 10 in thread status table 9 relevant to the corresponding thread processor is turned into a free state. At the same time, the number of the thread processor executing the child thread is obtained from child thread processor entry 12 corresponding to the thread processor number which executed the terminated parent thread. The thread status table 9 is again referred by the thread processor number obtained by the process described above, and the parent thread processor entry 11 for the thread processor is cleared (step S303). Thereby, the disappearance of the parent thread is indicated. Then, a thread termination grant signal is returned (step S304). The thread processor terminates the thread when it received the thread termination grant signal.

As described above, in the second embodiment according to the present invention, the fork operation is limited only once for one thread so that the maximum number of threads allowed to exist at the same time is controlled to be 'the number of thread processors+1'. Accordingly, the thread operation order is determined consistently and easily. Therefore, the multi-thread management can be realized using a hardware logic, not a software one. Thus, overhead for thread management can be drastically reduced which in turn, executes multi-thread more effectively. In the case that threads, whose number is more than that of thread processors, are created, when information for thread execution start (e.g., program counter, contents register) is saved by the execution of a system software, reservation of memory area for only one thread is needed. That is because one thread can perform only one fork operation.

Next, a third embodiment according to the present invention will be detailed with reference to the accompanying drawings.

Figure 7:
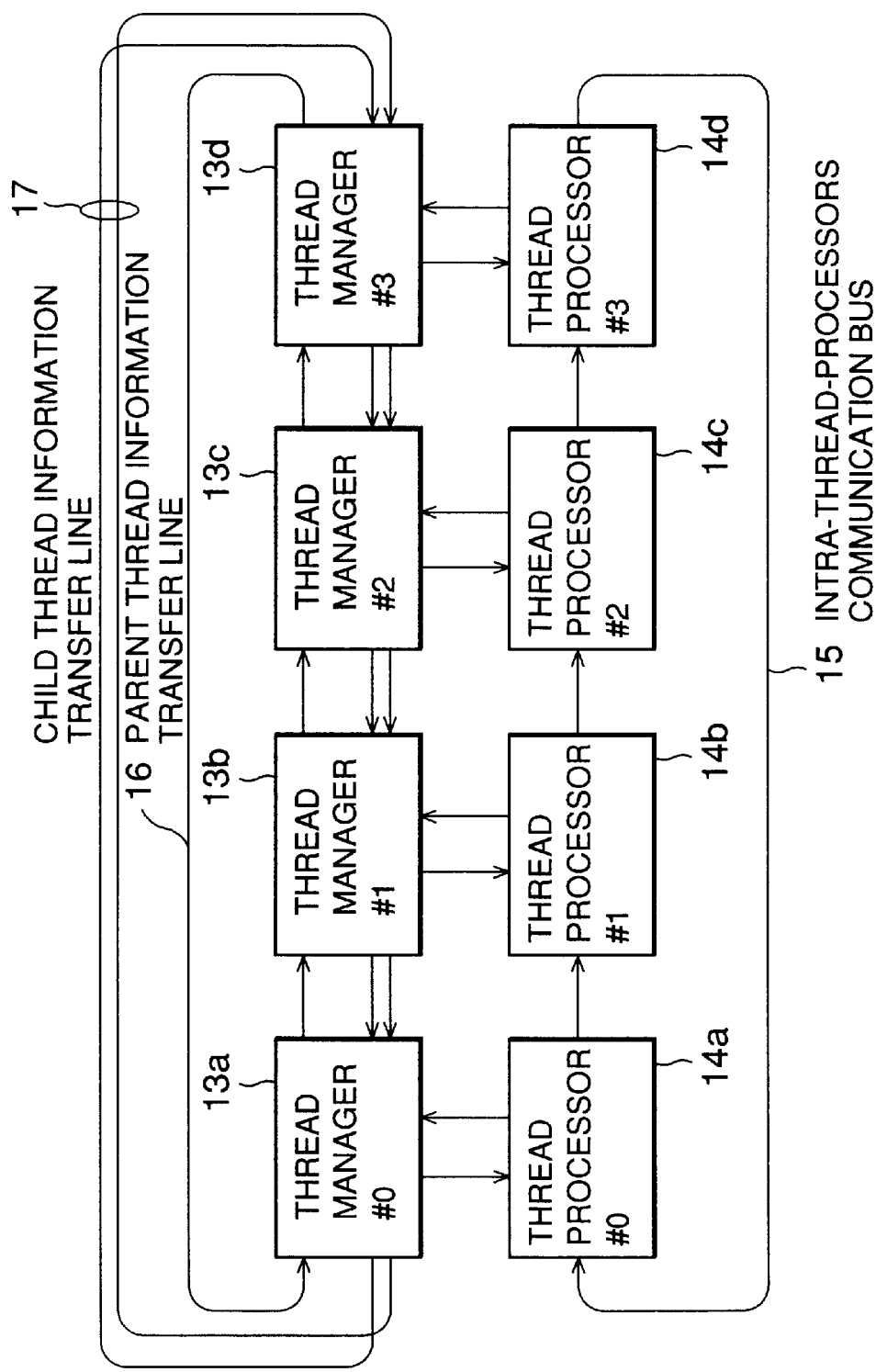
FIG. 7 shows a processor configuration to perform a multi-thread execution method of the third embodiment according to the present invention.

FIG. 7 shows the configuration of a processor to perform a multi-thread execution method of the third embodiment according to the present invention.

Referring to FIG. 7, thread processors #0 (14a), #1 (14b), #2 (14c) and #3 (14d) are respectively connected to thread managers #0 (13a), #1 (13b), #2 (13c) and #3 (13d). Neighboring thread processors in 14a, 14b, 14c and 14d are through intra-thread-processors communication bus 15 connected to each other in one direction in a loop shape. Neighboring thread managers in 13a, 13b, 13c and 13d are, through parent thread information transfer line 16, connected to each other in one direction which is the same as that of intra-thread-processors communication bus 15, and also connected to each other through child thread information transfer line 17, whose direction is opposite to intra-thread-processors communication bus 15. As shown, thread processors #0, #1, #2, and #3, and thread managers #0, #1, #2, and #3 are connected in a loop shape, and thus newly generated thread is allowed to be provided only to a neighboring thread processor in the direction of intra-thread-processors communication bus 15.

Figure 8:
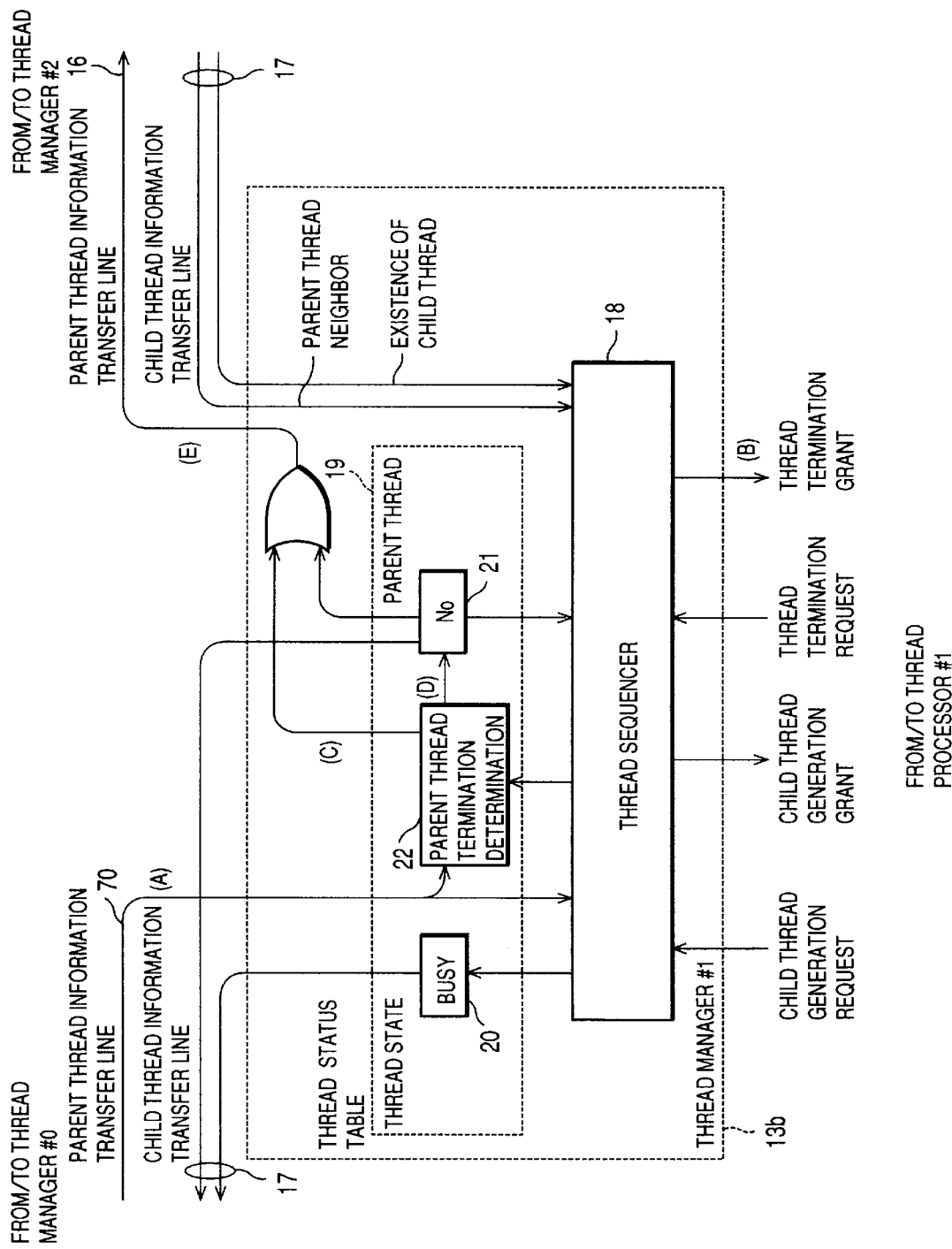
FIG. 8 shows a configuration of the thread manager in the processor shown in FIG. 7.

FIG. 8 shows the detail configuration of thread manager #1 (13b). In what follows, the configuration of thread manager #1 (13b) and its operation will be described. Other thread managers #0 (13a), #2 (13c) and #3 (13d) has the same configuration and operation as thread manager #1 (13b). Thread manager 13b is made up of thread sequencer 18 and thread status table 19. Thread status table 19 is made up of thread status entry 20, parent thread identification entry 21 and parent thread termination determination logical unit 22.

Parent thread information transfer line 16 designates whether or not the oldest parent thread exists in thread processors 14a through 14d. The output to thread manager #2 (13c) is determined in accordance with the logical sum of the direct outputs from both parent thread identification entry 21 and parent thread termination determination logical unit 22.

Figure 9:
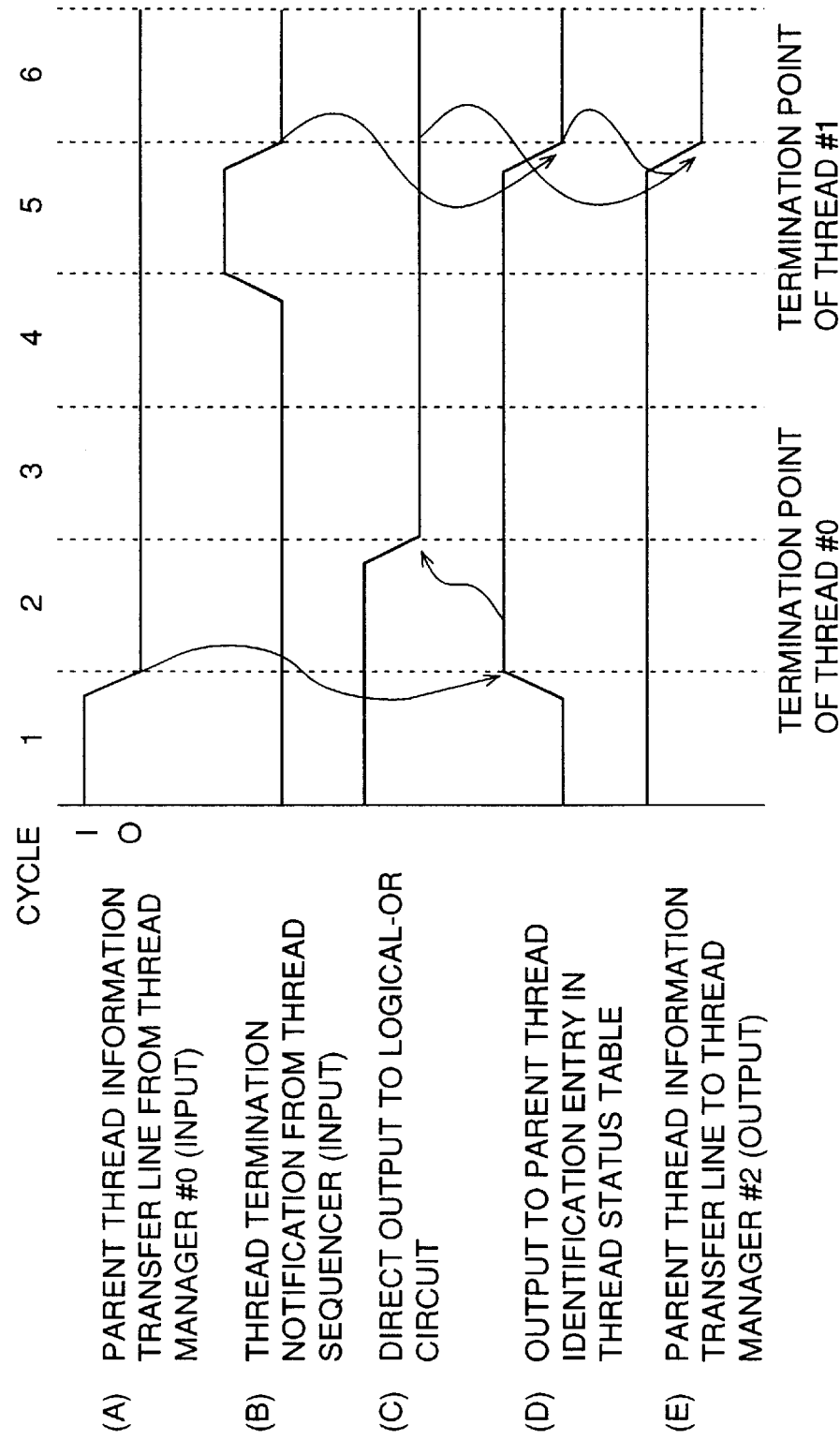
FIG. 9 is a timing chart to describe the operation of a parent thread termination determination logical unit in the thread manager as shown in FIG. 8.

FIG. 9 is a timing chart to describe the operation of parent thread termination determination logical unit 22. Referring to FIG. 9, (A) shows the signal behavior on parent thread information transfer line 16 from thread manager #0 (13a) to #1 (13b), and whether or not the oldest parent thread exists in the other thread processors. (B) shows a thread termination notification signal from thread sequencer 18 to thread processor #1 (14b). (C) shows an output signal from parent thread termination determination logical unit 22 to a OR circuit (see FIG. 8). (D) shows the output from parent thread termination determination logical unit 22 to parent thread identification entry 21 in thread status table 9. (E) shows the output from the OR circuit, and the output value is the one through parent thread information transfer line 16 to thread manager #2 (13c).

We shall assume that the oldest parent thread has been executed by thread processor #0 (14a) at a initial state. At this time, from (A) and (E), thread processors #1 (14b) and #2 (14c) can see that another parent thread exists (i.e., a parent thread is not executed by thread processor #1 (14b) or #2 (14c)). When thread processor #0 (14a) finishes the execution for the oldest thread in cycle 1, thread manager #0 (13a) notifies to thread manager #1 (13b) in cycle 2 that no older parent thread than the thread being currently executed exists, as shown in (A). When thread manager #1 (13b) receives the notification, at the same time, it updates the state of a parent thread in parent thread identification entry 21 as shown in (D). Moreover, the direct output to the OR circuit is reset in cycle 3, as shown in (C). The signal on parent thread status transfer line 16, which connects to thread manager #2 (13c), does not change, as shown in (E).

Next, the case when the thread executed by thread processor #1 (14b) will be described. Referring to FIG. 9, the thread termination notification signal, as shown in (B), is used to inform about the termination in cycle 5. Accordingly, parent thread identification entry 21 is updated into the state of non-parent thread in cycle 6, as shown in (D). The logical sum of (C) and (D), which means the oldest thread does not exist in before thread processor #1 (14b), is transferred through parent thread status transfer line 16 to thread manager #2 (13c). In this manner, essential information for thread management is provided to several thread managers #0 (13a) through #3 (13d).

Figure 10:
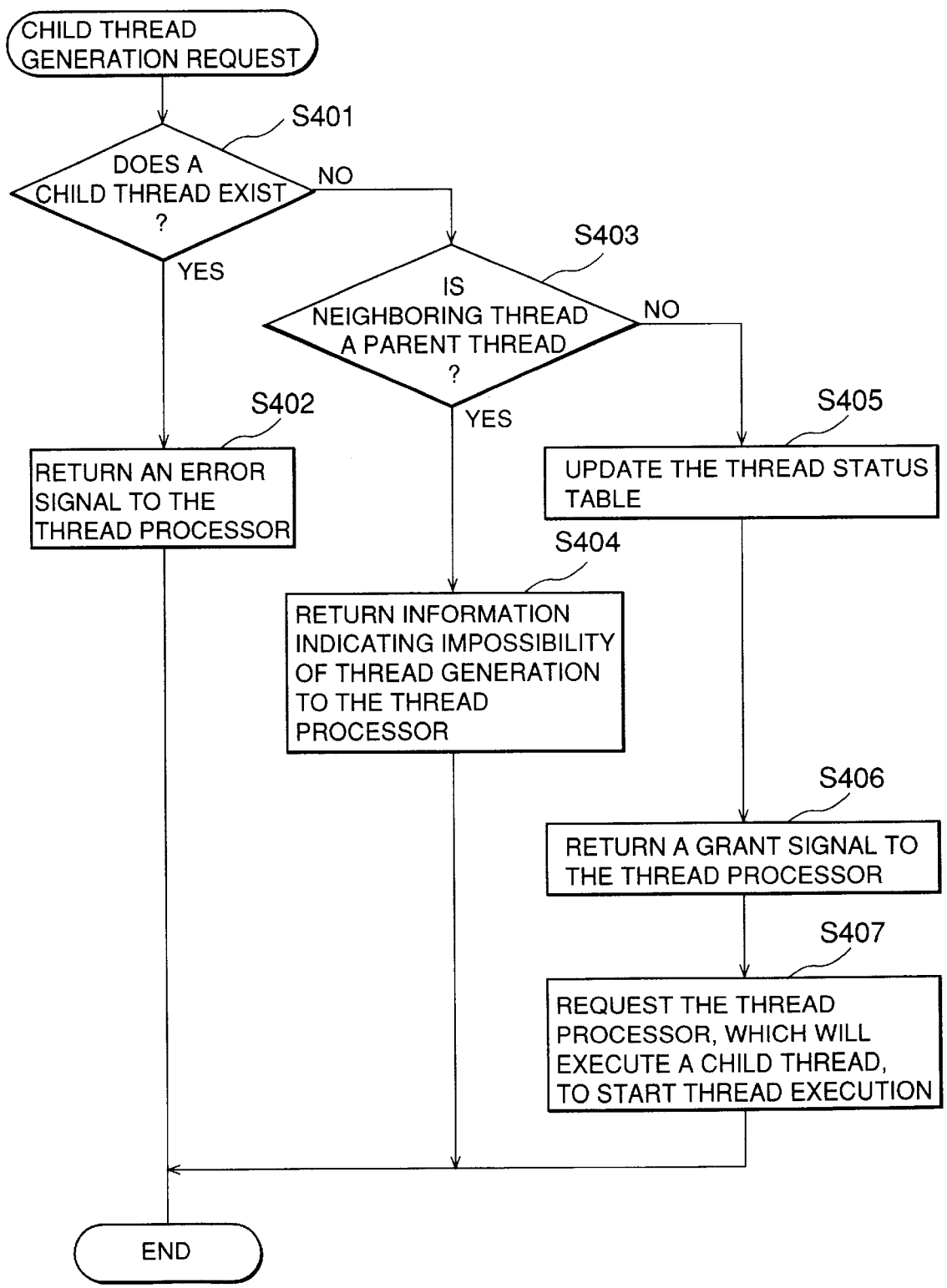
FIG. 10 is a flowchart to describe the operation of the thread sequencer as shown in FIG. 8 at the time of thread generation.
Figure 11:
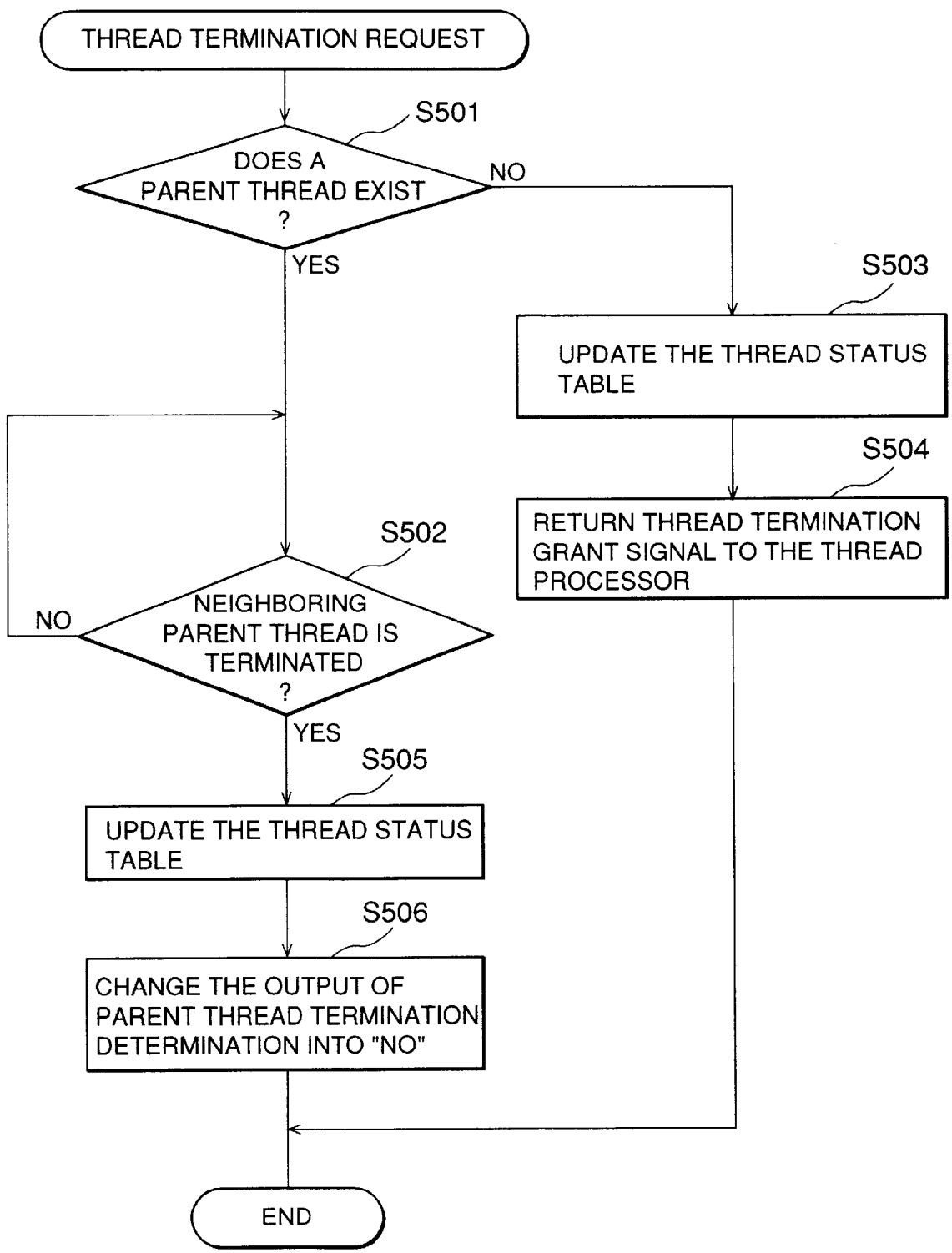
FIG. 11 is a flowchart to describe the operation of the thread sequencer as shown in FIG. 8 at the time of thread termination.

FIG. 10 shows the algorithm of the operation of thread sequencer 18, shown in FIG. 8, at the time of thread generation. FIG. 11 shows the algorithm of the operation of thread sequencer 18 at the time of thread termination.

The basic algorithms shown in FIGS. 10 and 11 are the same as those shown in FIGS. 5 and 6. The information, on whether a child thread exists and whether a neighbor thread in child thread generation direction is the oldest parent thread, is transferred to thread sequencer 18 through child thread information transfer line 17 (shown in FIGS. 7 and 8).

Referring to FIGS. 8, 9 and 10, when thread sequencer 18 in thread manager #1 (13b) receives a child thread generation request from thread processor #1 (14b), it determines whether or not other child thread has been already generated using information on child thread information transfer line 17 (step S401). Then, if a thread has been already generated, thread sequencer 18 in thread manager #1 (13b) does not generate a thread, and sends the reply of an error signal to thread processor 14b (step S402). On the other hand, if a thread has not been generated, thread sequencer 18 in thread manager #1 (13b) determines whether or not neighboring thread processor #2 (14c) is not executing the oldest parent thread (step S403).

Next, if thread processor #2 (14c) is executing the oldest parent thread, it is impossible to physically generate a thread. Thus, thread sequencer 18 in thread manager #1 (13b) has thread processor #1 (14b) wait until thread generation is allowed, like shown in FIG. 5, or send a reply of information on impossibility of thread generation to thread processor #1 (14b) so as to have a system software run and save information for child thread start (child thread start information) into a memory (step S404). The child thread start information includes information like PSW (e.g., program counter, contents of register). When thread processor #2 (14c) terminates a thread, thread sequencer 18 in thread manager #1 (13b) informs the effect of it to thread processor #1 (14b).

When thread processor #2 (14c) is in a free-state, thread sequencer 18 in thread manager #1 (13b) changes thread status entry 20 from a free-state into a busy-state (step S405), and sends a reply of grant signal to thread processor #1 (14b) (step S406). Thread generation unit #1 (14b), which received the information, sends takeover information (e.g., taking-over data, a thread start address and so on) to thread processor #2 (14c) through intra-thread-processors communication bus 15 (step S407) to start a child thread.

Referring to FIGS. 8, 9 and 11, the operation, of thread sequencer 18 in thread manager #1 (13b) at the time of thread termination by thread processor #1 (14b), will be described. A thread is not terminated as long as its parent thread is not terminated so as to guarantee that the thread termination order is the same as the thread generation order. The parent thread termination is sent through parent thread information transfer line 16. If the parent thread is not terminated (step S501), thread processor #1 (14b) is forced into a wait-state until the parent thread can terminate (step S502). When the parent thread is terminated (i.e., when the thread being executed by thread processor #1 (14b) is the oldest parent thread), the same procedure of process shown in FIG. 6 is performed (steps S503 and S504), and sends a thread termination grant signal as thread termination permission for thread processor #1 (14b). Accordingly, thread processor #1 (14b) receives the signal, and then terminates a thread.

Further, when a neighboring thread is terminated, thread sequencer 18 in thread manager #1 (13b) updates thread status table (thread management table) 19 (step S505), and changes parent identification entry 21 into 'No' so as to change the output of parent thread termination determination into 'N0' (step S506).

Like in the manner as described above, in the third embodiment of the present invention, each thread manager can be configured very simply even though the number of thread processors is increased, by preparing a separate thread manager for each thread processor.

Next, a fourth embodiment of the present invention will be detailed with reference to the accompanying drawings.

Figure 12:
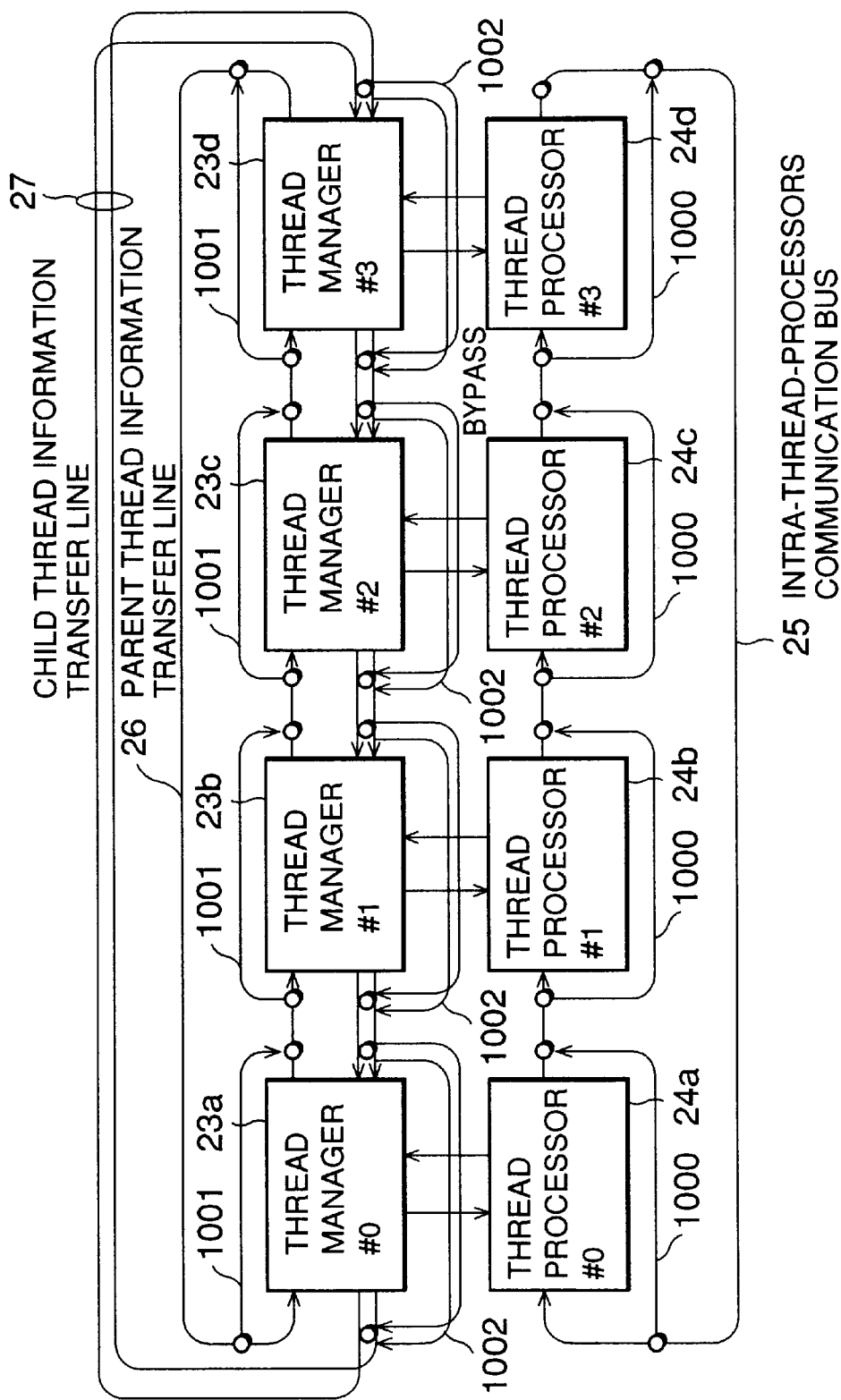
FIG. 12 shows the configuration of a processor to perform a multi-thread execution method of a fourth embodiment according to the present invention.

FIG. 12 shows the configuration of a processor with which a multi-thread execution method of the fourth embodiment according to the present invention. The multi-thread execution method of the fourth embodiment according to the present invention provides enhanced fault tolerance by giving redundancy in a multi-processor system.

The processor shown in FIG. 12 includes thread managers 23a through 23d, thread processors 24a through 24d, intra-thread-processors communication bus 25, parent thread information transfer line 26, and child thread information transfer line 27, as in the same configuration as the processor shown in FIG. 7. Here, intra-thread-processors communication bus 25 includes extension buses 1000 to bypass each of thread processors #0 (24a) through #3 (24d). In the same manner, parent thread information transfer line 26 includes extension lines 1001 to bypass each of thread managers #0 (23a) through #3 (23d). Moreover, child thread information transfer line 27 includes extension lines 1002.

In the fourth embodiment of the present invention, even if a failure like a malfunction and breakdown occurs in thread processors #0 (24a) through #3 (24d) or thread managers #0 (23a) through #3 (23d), an original program can be executed by bypassing the troubled thread processor and/or the troubled thread manager using the aforementioned extension buses 1000 and/or extension lines 1001 and 1002.

Figure 13:
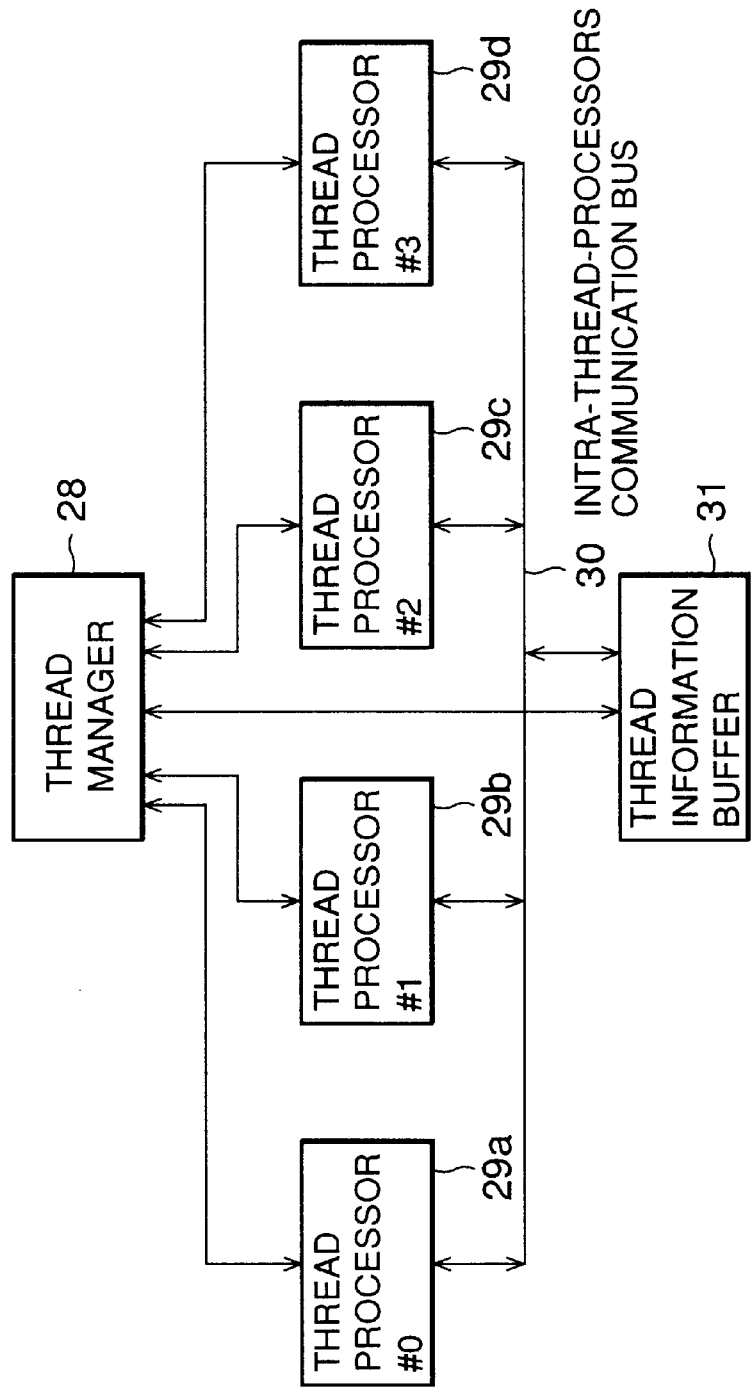
FIG. 13 shows the configuration of a processor to perform a multi-thread execution method of a fifth embodiment according to the present invention.

Next, FIG. 13 shows the configuration of a processor with which performs a multi-thread execution method of the fifth embodiment according to the present invention.

The processor shown in FIG. 13 includes thread manager 28, thread processors #0 (29a) through #3 (29d), and intra-thread-processors communication bus 30. Thread manager 28 is connected to thread processors #0 (29a) through #3 (29d). Thread processors #0 (29a) through #3 (29d) are commonly connected to intra-thread-processors communication bus 30.

The processor further includes thread information buffer 31 connected to thread manager 28 and thread processors #0 (29a) through #3 (29d). Thread information buffer 31 saves a thread execution start address and data essential for starting a thread execution when one of thread processors #0 (29a) through #3 (29d) executes the latest child thread generation instruction while the other thread processors are all executing threads.

Figure 14:
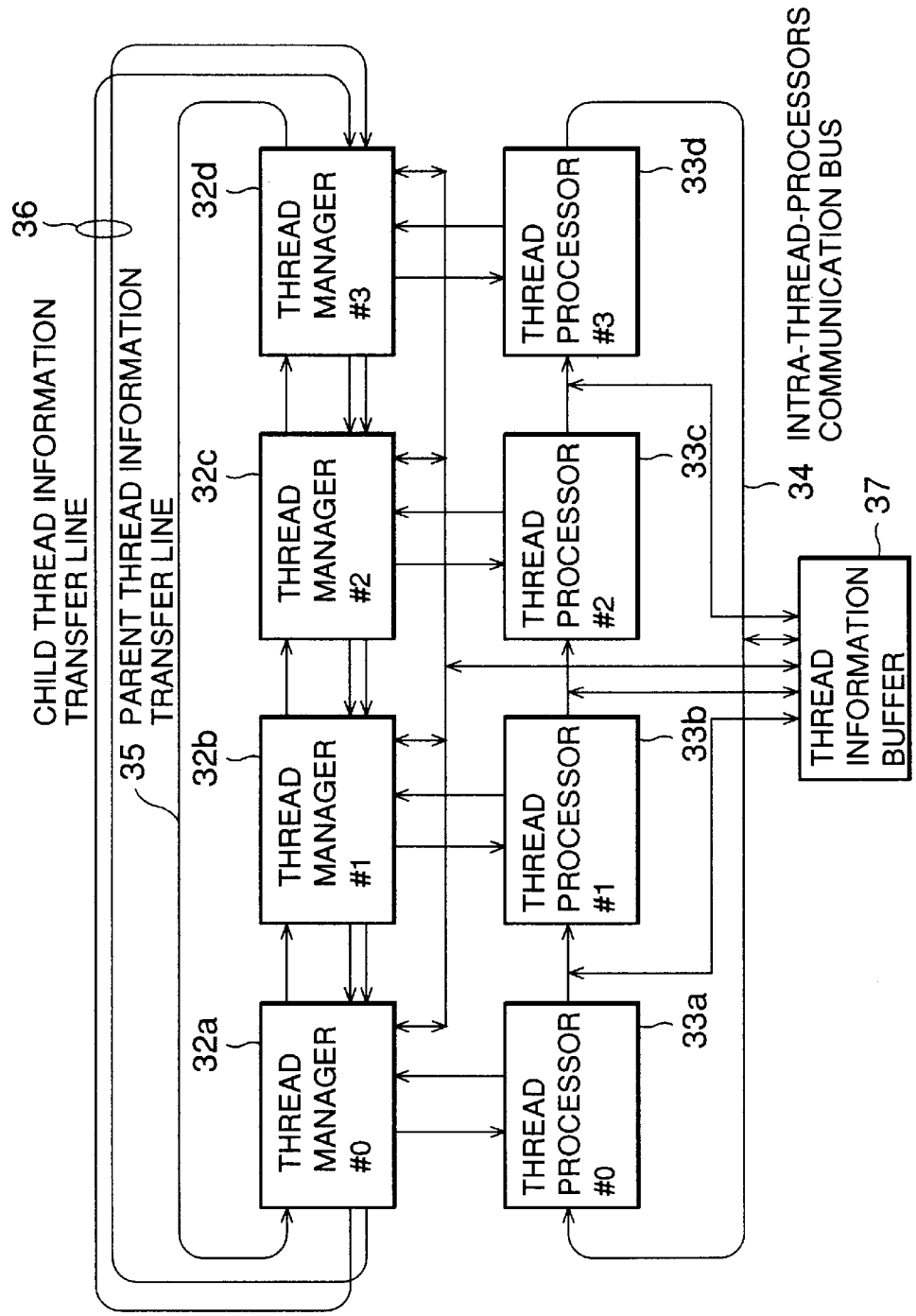
FIG. 14 shows the configuration of another processor to perform a multi-thread execution method of a fifth embodiment according to the present invention.

The processor shown in FIG. 14 is an example modification of the fifth embodiment according to the present invention, a processor configuration in the same form as shown in FIG. 7 and thread information buffer 37 equivalent to thread information buffer 31 added to it. The processor shown in FIG. 14 includes thread managers #0 (32a) through #3 (32d), thread processors #0 (33a) through #3 (33d), intra-thread-processors communication bus 34, parent thread information transfer line 35, and child thread information transfer line 36. Thread information saving line 37 saves a thread execution start address and data essential for starting a child thread's execution when one of thread processors #0 (33a) through #3 (33d) executes the latest child thread generation instruction while the other thread processors are all executing threads.

Figure 15:
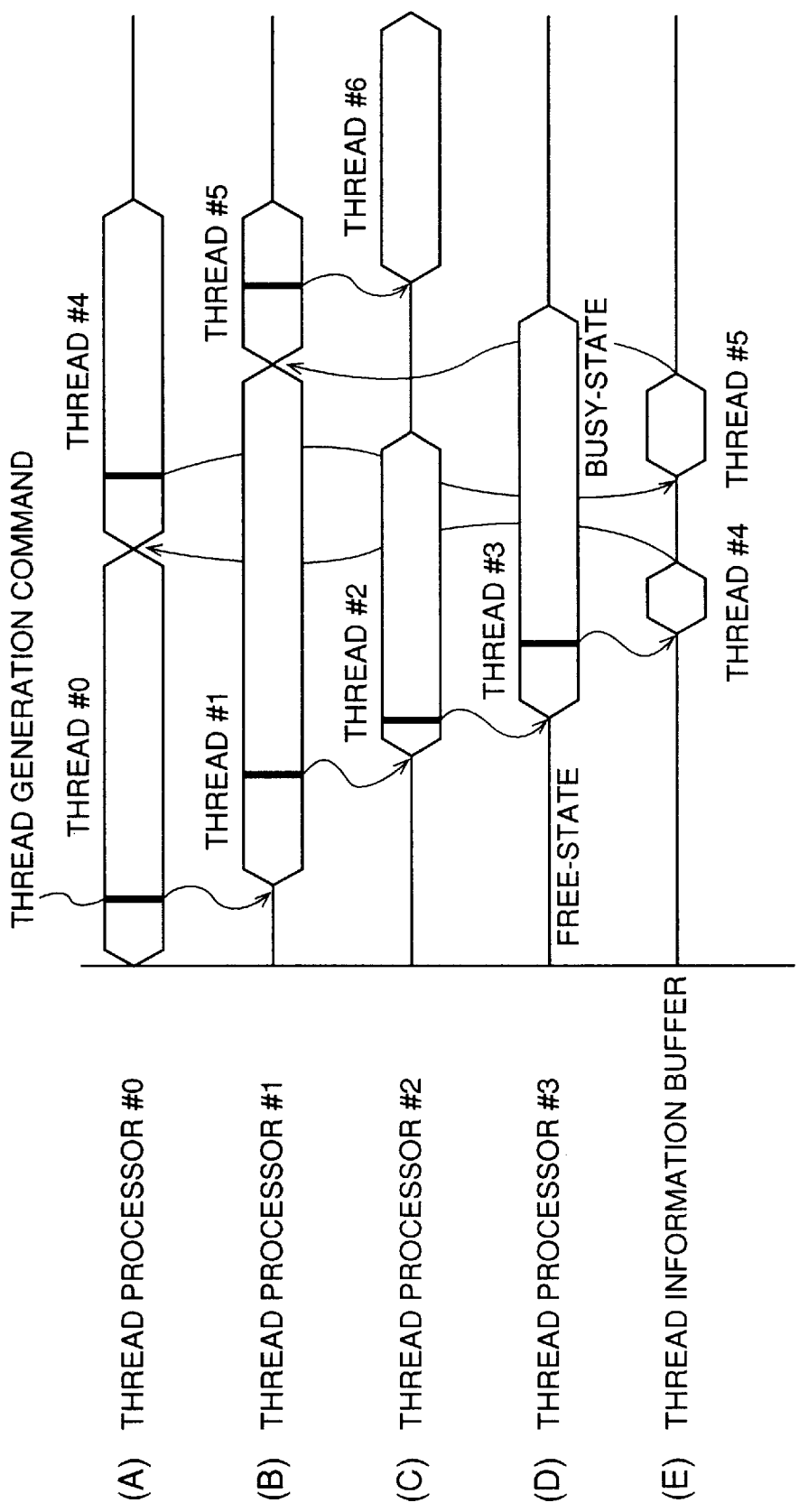
FIG. 15 is a timing chart to describe the operation of the processors shown in FIGS. 13 and 14.

FIG. 15 is a timing chart to describe the operation of the processor shown in FIGS. 13 and 14. The operation given in FIG. 15 is basically similar to that in FIG. 2. In FIG. 15, the status of thread information buffer as shown in (E) is added. Thread processor #3 as shown in (D) is executing thread #3, and when it executes a thread generation instruction for thread #3, no "free" thread processors exist because thread processors #0, #1 and #2 as shown in (A), (B) and (C), respectively, are executing respective threads #0, #1 and #2. Therefore, thread manager 28 (or 32) stores the child thread start information into thread saving buffer 31 (or 37). Thread processor #3 as shown in (D) continues to execute thread #3.

When thread processor #0 as shown in (A) terminates the execution of thread #0, it enters a "free"-state. At this time, thread manager 28 (or 32) pulls the child thread start information out of thread saving buffer 31 (or 37), and uploads it into thread processor #0 to start the child thread, or thread #4.

As described above, in the fifth embodiment of the present invention, even if the number of threads exceeds that of thread processors of a parallel system, thread management can be properly made using hardware in the system. Thread saving buffer 31 (or 37) needs the capacity only for thread start information for one thread.

Next, a sixth embodiment of the present invention will be described in detail with reference to the accompanying drawings.

Figure 16:
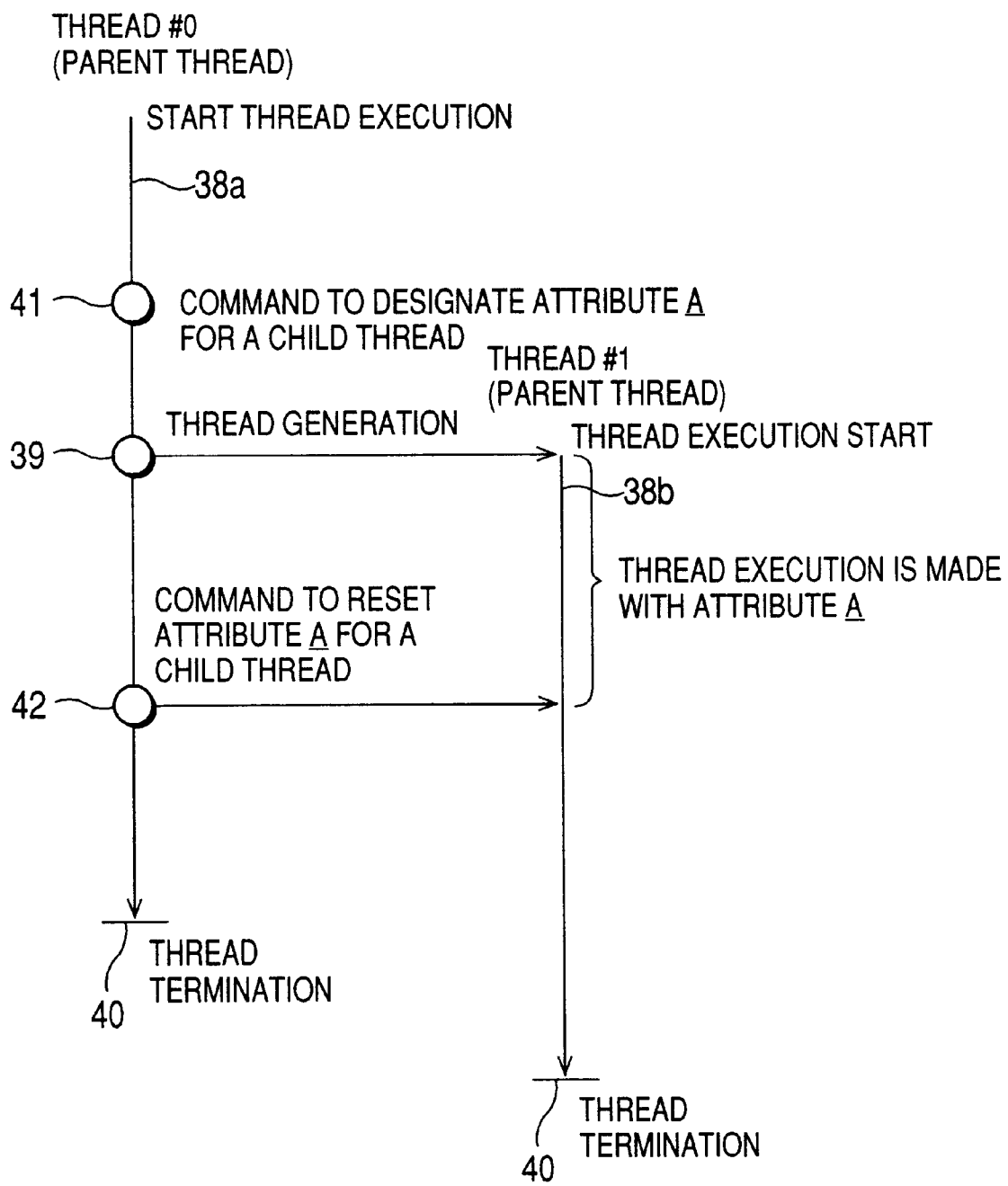
FIG. 16 is a flowchart to describe a multi-thread execution method of a sixth embodiment according to the present invention.

FIG. 16 is a flowchart to describe a multi-thread execution method of the sixth embodiment according to the present invention. The multi-thread execution method of the sixth embodiment according to the present invention is to designate attributes relevant to the operation of a child thread by the procedure of a parent thread.

FIG. 16 is a flowchart giving an example process to the procedure for attribute designation using a special instruction. Thread #0 (38a) generates child thread #1 (38b) by using thread generation instruction 39. Before the thread generation instruction to generate child thread #1 (38b) is executed, the attribute of the child thread is designated, for example, to an attribute "A" using attribute designation instruction 41. Thereby, child thread #1 (38b) performs the operation in accordance with the attribute "A". An example of the attributes includes reference restriction to specific memory addresses, priority order to access specific resources, and restriction of specific instruction's execution.

Resets of the attributes are done by executing attribute reset instruction 42 by parent thread #0. Further, when a child thread itself forks, whether or not the aforementioned attributes are taken over is also designated by a parent thread. Moreover, child thread #1 can obtain the status of it (e.g., by preparing a instruction for getting to know the status of itself, or referring to a special register).

In the manner as described above, according to the sixth embodiment of the present invention, the operation of a child thread can be controlled by designating attributes relevant to the operation of a child thread by the procedure of a parent thread. That is, even though data access pattern from a child thread is unknown, or whether or not a child thread will be executed is not determined, the parallel execution of the child thread can be made.

Next, a seventh embodiment of the present invention will be described with reference to the accompanying drawings.

Figure 17:
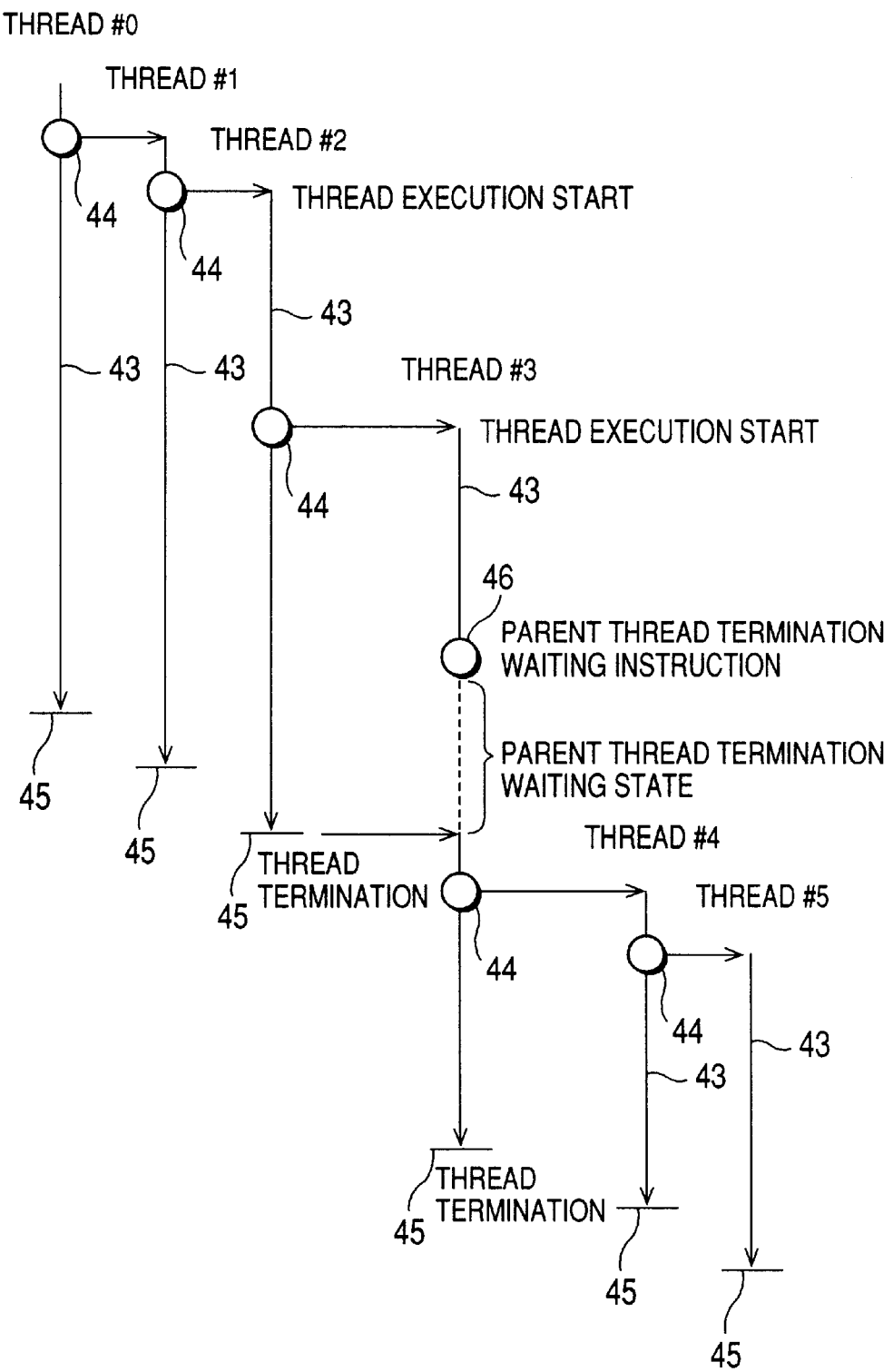
FIG. 17 is a flowchart to describe a multi-thread execution method of a seventh embodiment according to the present invention.

FIG. 17 is a flowchart to describe a multi-thread execution method of the seventh embodiment according to the present invention. The multi-thread execution method of the seventh embodiment according to the present invention prevents a child thread from being executed without waiting for the termination of its parent thread.

In the case where the operation as to 2-dimensional array is made, processes on the array in column and row direction may be made in turn. In this case, on synchronization, all the threads are made at the time when the process in column direction is finished, and the process in row direction needs to be started. Moreover, a child thread cannot detect the termination of its parent, or termination of a main operation portion in a loop body as long as the multi-thread execution method of the first embodiment according is used. Thus, a procedure of waiting for the termination of a parent thread is added in the seventh embodiment. FIG. 17 shows an example in that the procedure of waiting is executed using the special instruction of waiting for parent thread termination instruction 46. Further, 43 denotes a thread, 44 denotes a thread generation instruction, and 45 denotes thread termination instruction in FIG. 17.

Referring to FIG. 17, when parent thread queuing instruction 46 is executed in thread #3, thread #3 continue to be in a wait-state until thread #2 is terminated. Thereby, synchronization can be made in a parallel processing in a loop. In the program given in the first embodiment, for example, the following special instruction 'pwait' is inserted into the line of 0x40f060. Thereby, synchronization can be realized.

40f040: fork 0x10 <0x40f050>
    40f044: addu r4, r14, r18
    40fb48: jal 0x40e99c <0x40e99c>
    40f04c: term
    40f050: addiu r17, r17, 0x8
    40f054: slti r1, r17, 0x40
    40f058: sll r14, r17, 1
    40f05c: bne r1, r0, −0x20 <0x40f040>
    40f060: pwait In the seventh embodiment of the present invention, it is the termination of a parent thread that is waited. Alternatively, however, it is also possible that waiting is made until the number of parent threads becomes under a fixed number, which is set by a instruction. Moreover, it is also possible to wait until the execution of a parent thread reaches an address.

Next, an eight embodiment of the present invention will be described in detail with reference to the accompanying drawings.

Figure 18:
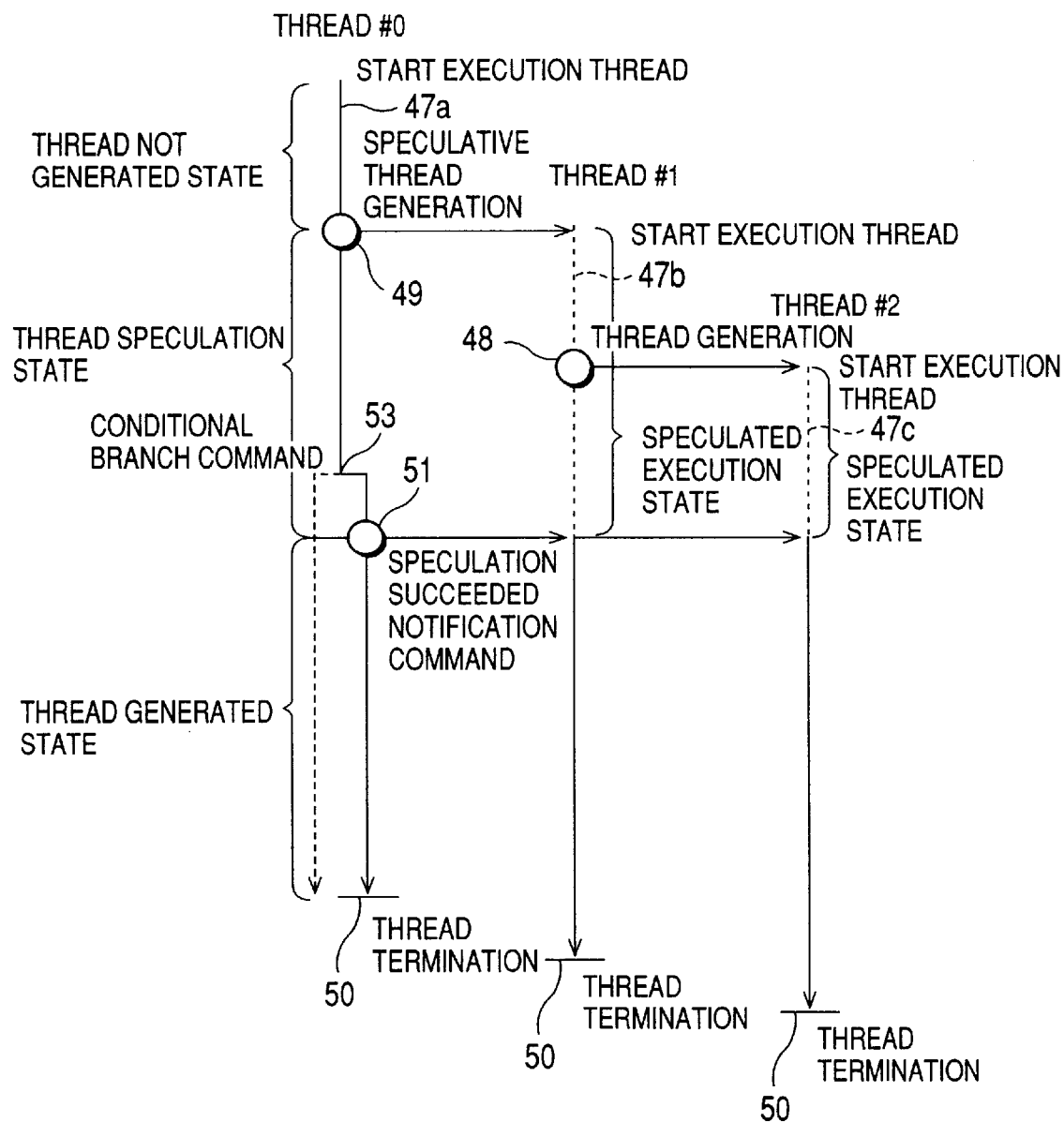
FIG. 18 is a flowchart to describe a multi-thread execution method, when speculation is succeeded, of the eighth embodiment according to the present invention.
Figure 19:
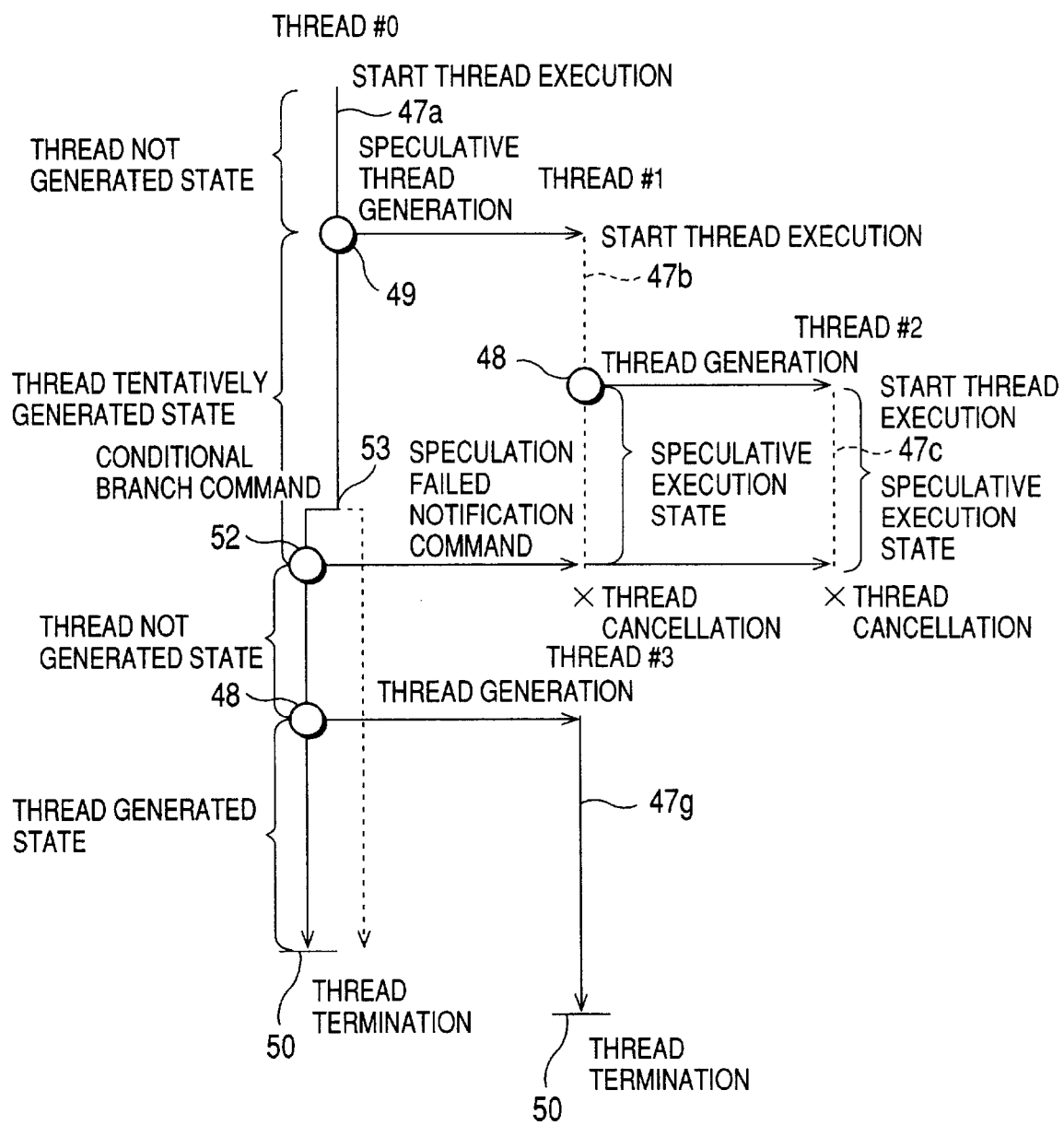
FIG. 19 is a flowchart to describe a multi-thread execution method, when speculation is failed, of the eighth embodiment according to the present invention.

FIGS. 18 and 19 are flowcharts to describe a multi-thread execution method of the eighth embodiment according to the present invention. In the multi-thread execution method of the eight embodiment according to the present invention, more parallelism can be attained by making a thread generation timing earlier. That is, in the method, when it can not be determined whether or not a child thread generation is necessary until the process of its parent thread stabilizes to some extent, a speculative thread is generated. Then, a speculatively generated child thread is settled or canceled in accordance with a proceeding step of the parent thread after the generation.

FIG. 18 shows the case in which the speculation is succeeded while FIG. 19 shows the case in which the speculation is failed.

Referring to FIG. 18, when thread #0 (47a) executes a speculative thread generation instruction 49, thread #1 (47b) is generated. Then, thread #1 (47b) begins to execute, and thread #0 enters a thread-speculative state. When thread generation instruction 48 is executed in the speculatively execution state of thread #1 (47b), thread #2 (47c) generated accordingly takes over the speculatively execution attribute of thread #1 (47b), and is executed in a speculative execution state. After conditional branch instruction 53 is executed in thread #0 (47a), if the speculation of the thread generation is determined as successful, speculation succeeded notification instruction 51 is executed. Accordingly, the speculative execution state of threads #1 (47b) and #2 (47c) is reset, and thread #0 (47a) enters a thread generation state.

The process as shown in FIG. 19 is performed in the same manner. If a branch is made in the opposite direction to the case shown in FIG. 18, it is determined that the thread generation is failed. At this time, speculation failure notification instruction 52 is executed in thread #0 (47a). Thereby, the execution of threads #1 (47b) and #2 (47c) is canceled. By executing speculation failure notification instruction 52, thread #0 (47a) returns from a thread speculatively generation state to a no thread generation state. Thus, thread generation instruction 48 is allowed to be executed again.

Figure 20:
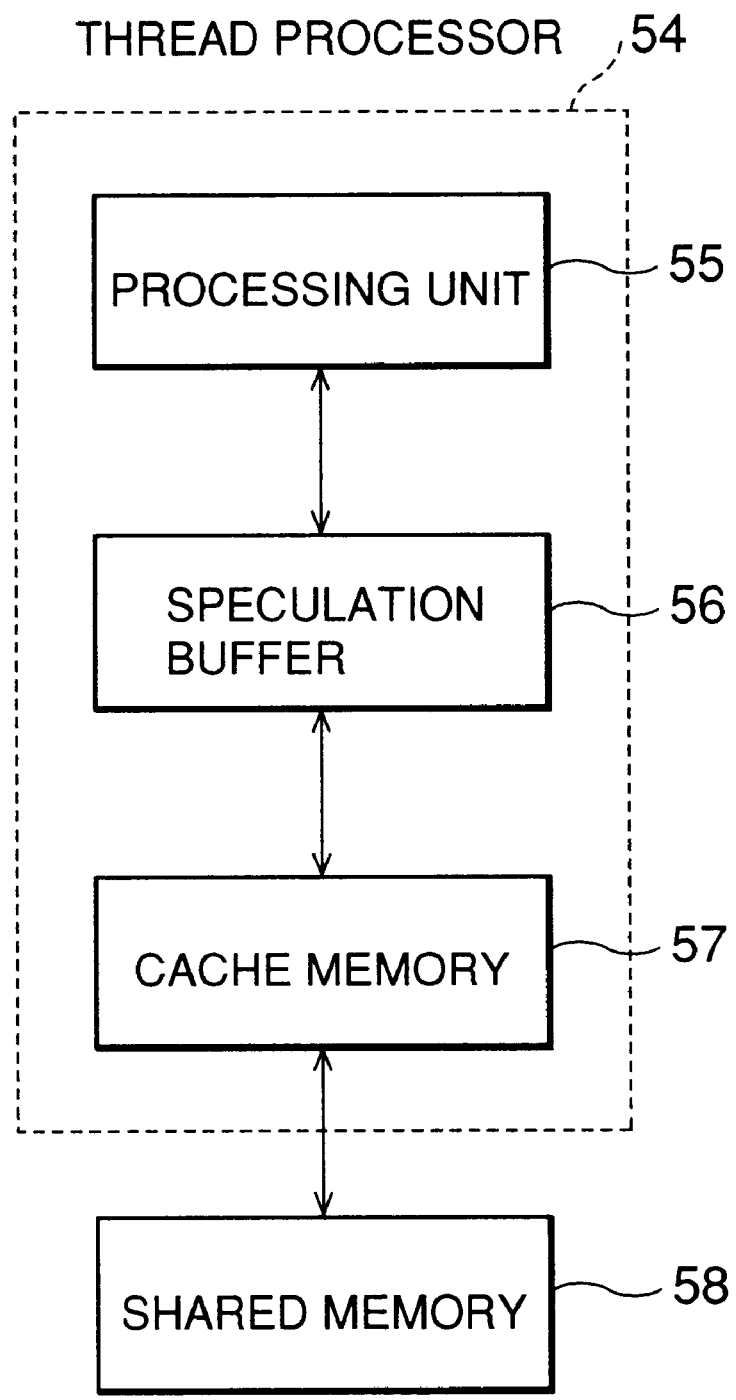
FIG. 20 shows the configuration of a thread processor in the processor to perform a multi-thread execution method of the eight embodiment according to the present invention.

When the speculative thread generation as shown in FIG. 19 is failed, it is necessary to prevent side-effects due to a speculative execution from occurring in a parallel processing system. Therefore, writing into a shared memory and so on should be controlled. To satisfy the conditions just mentioned above, thread processor 54 has, as shown in FIG. 20, speculation buffer 56, which controls update of cache memory 57 and shared memory 58, as well as processing unit 55 and cache memory 57 during speculative execution waiting.

Such a multi-thread execution method is effective when, for example, the following loop operation which repeats until a given error converges:

while (error is not converged) {
  operations:
  error calculation;
}

In this case, a child thread is speculatively generated when the operations are made. Then, when the result of the error calculation satisfies a given convergence condition, cancellation of the thread executing the next operation can be made feasibly using the multi-thread execution method.

Next, a ninth embodiment of the present invention will be described in detail with reference to the accompanying drawings.

Figure 21:
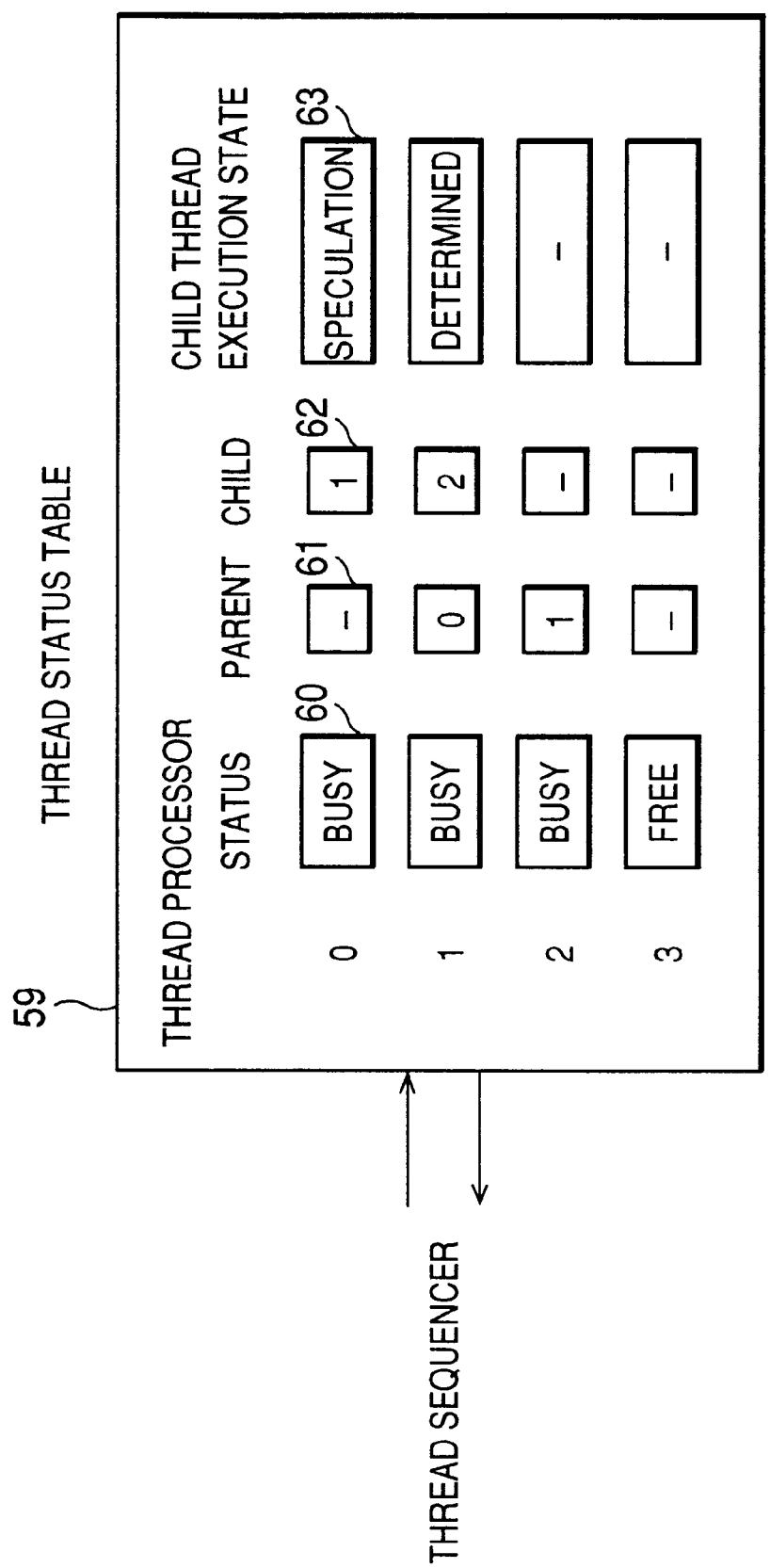
FIG. 21 shows the configuration of a thread status table in a processor to perform a multi-thread execution method of a ninth embodiment according to the present invention.

FIG. 21 shows the configuration of thread status table 59 in the thread manager, with which a multi-thread execution method of the ninth embodiment is performed. The multi-thread execution method of the ninth embodiment according to the present invention is the one in which thread status table 9 (shown in FIG. 4) of the second embodiment is extended so as to put the aforementioned multi-thread execution method of the sixth embodiment into practice. In the ninth embodiment, we shall assume that the 'speculation' attribution as described in the eighth embodiment is taken over from a parent thread to its child thread.

Thread status table in FIG. 21 includes thread status entry 60, parent thread processor number entry 61, and child thread processor number entry 62, as in the same configuration as thread status table 5 in FIG. 4. Thread status table 59 further includes a child thread execution status entry 63 to assist a speculative thread generation. Child thread execution status entry 63 indicates the status of a child thread from a view point of its parent thread. Thus, in the example as shown in FIG. 21, since child thread execution status entry 63 for thread processor #0 is set as in a speculative state; threads being executed by thread processors #1 and #2 are executed in a speculative execution state. This indicates that speculative thread generation instruction 49 is executed in thread #0 while thread generation instruction 48 is executed in thread #1.

In this case, the execution state of thread processor #2 enters a speculative state which is caused by the logical sum of child thread execution status entry 63 for thread processor #0 and child thread execution status entry 63 for thread #1. At the point of time when thread processor #0 executes speculation succeeded notification instruction 51, child thread execution status entry 63 for thread processor #0 enters a determined execution state (i.e., nonspeculative execution state), and threads being executed by respective thread processors #1 and #2 enter a determined execution state from a speculative execution state.

As described above, in the ninth embodiment of the present invention, thread management is made in a concentrated manner using thread status table 59. Moreover, status of each of the younger child threads can be determined by taking the logical sum of the statuses of the parent threads.

Figure 22:
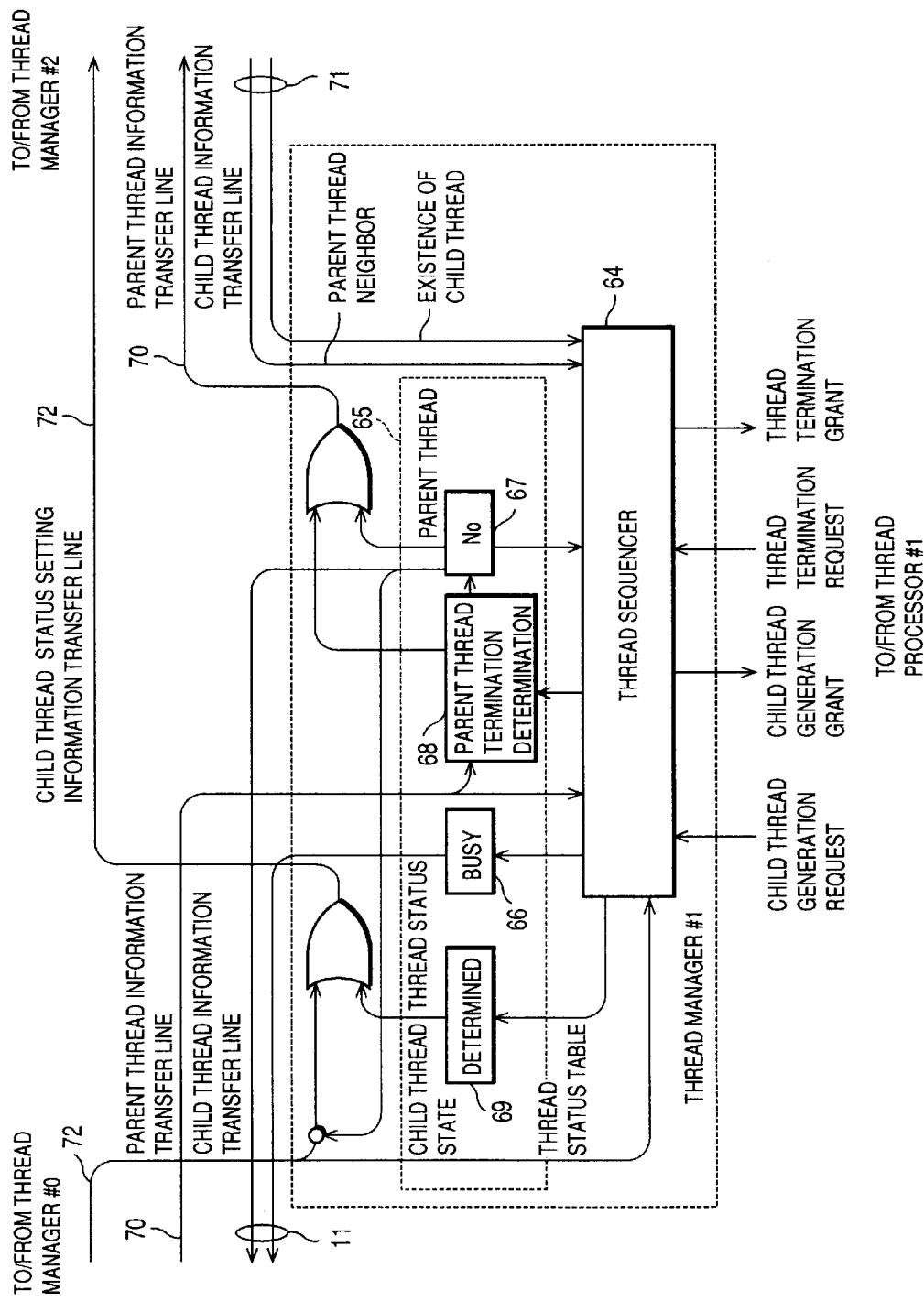
FIG. 22 shows the configuration of a thread manager in a processor to perform a multi-thread execution method of a tenth embodiment according to the present invention.
Figure 23:
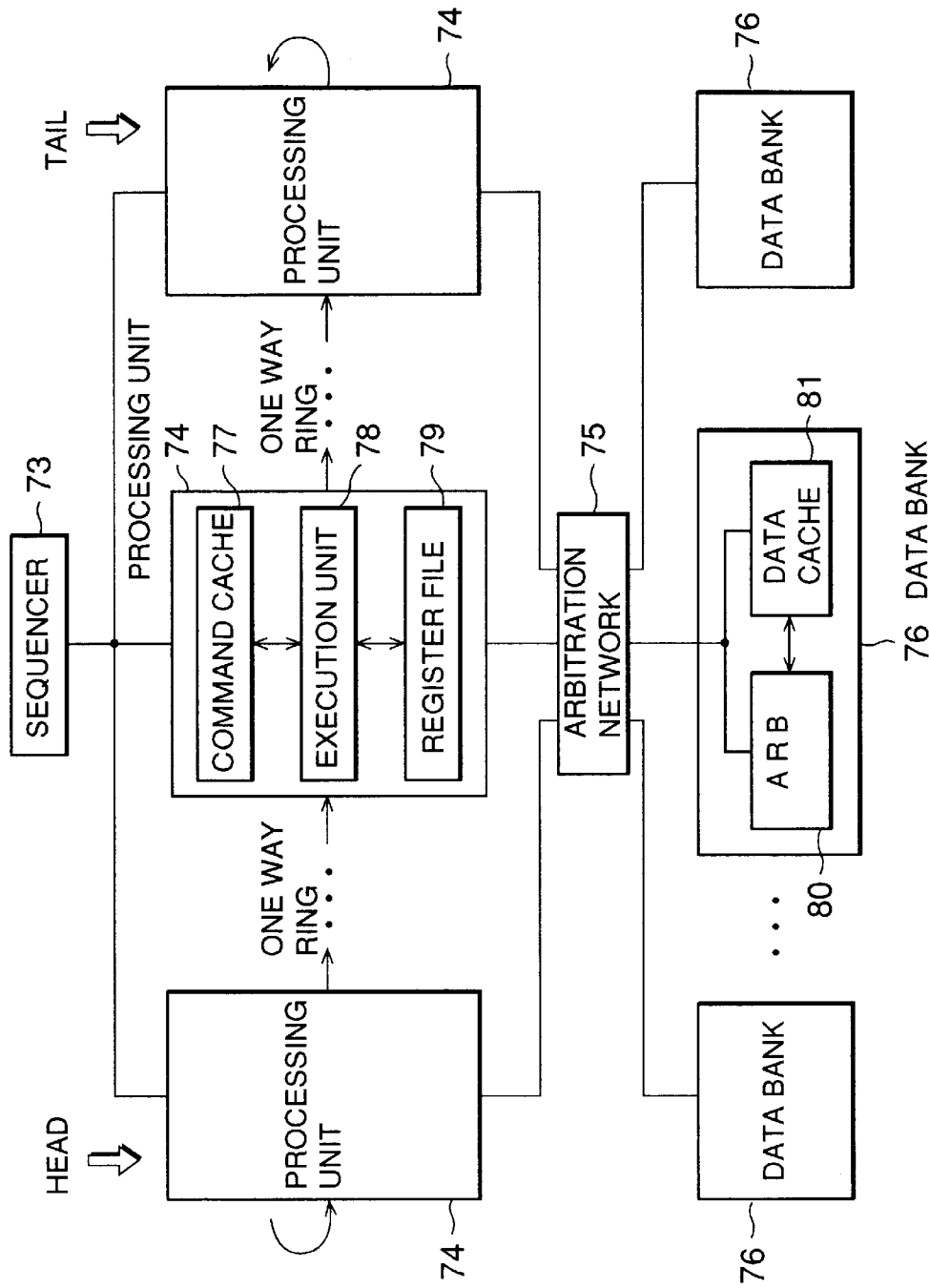
FIG. 23 shows the configuration of a conventional multiscalar processor.
Figure 24:
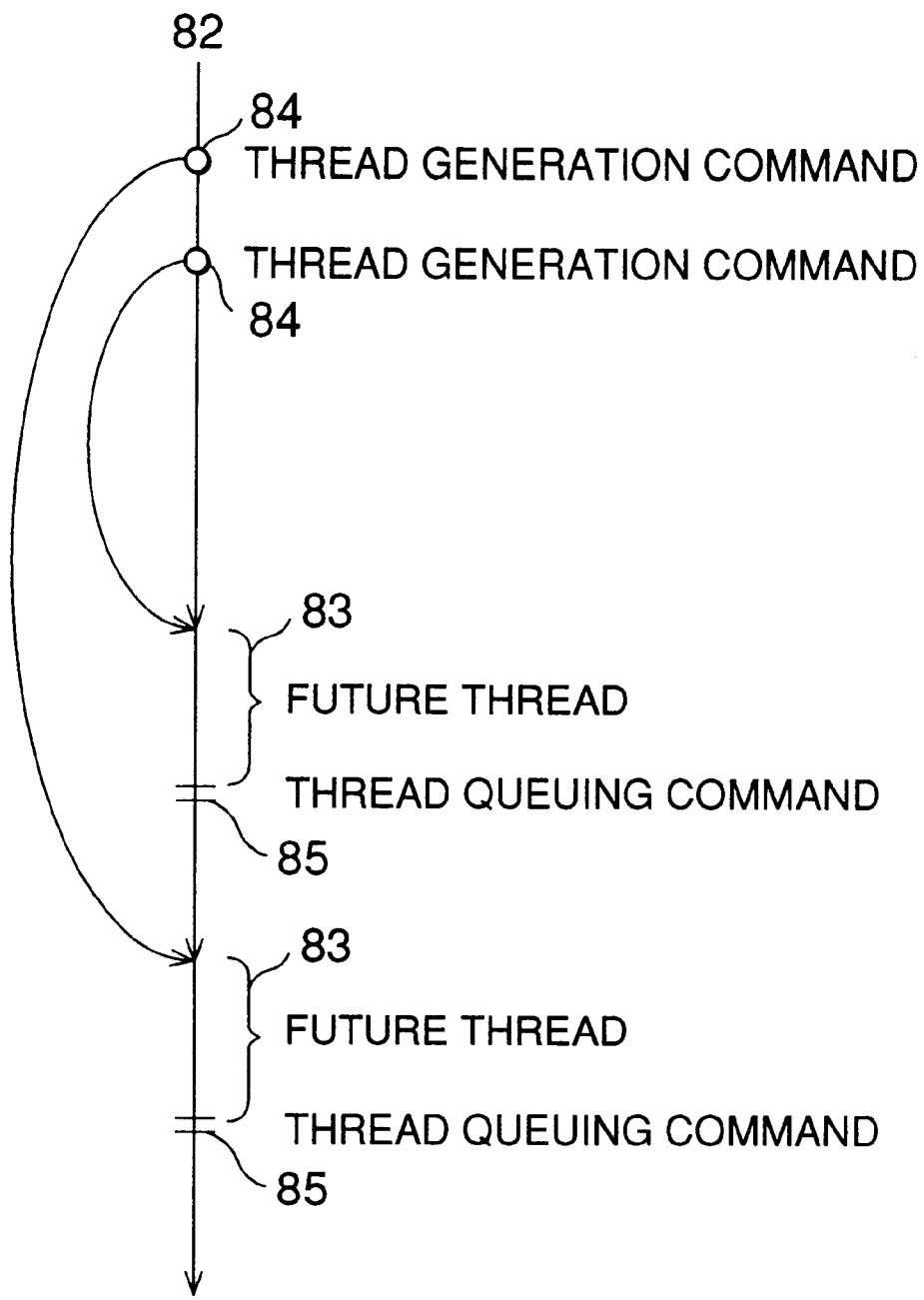
FIG. 24 is a flowchart to describe the thread execution method in the conventional SPSM architecture.

Next, a tenth embodiment of the present invention will be described in detail. FIG. 22 shows the configuration of thread manager #1 to describe a multi-thread execution method of the tenth embodiment according to the present invention. The multi-thread execution method of the tenth embodiment according to the present invention is the one in which the thread manager (shown in FIGS. 7 and 8) of the aforementioned third embodiment is extended so as to put the multi-thread execution method of the sixth embodiment into practice. In the tenth embodiment, we shall assume that the aforementioned 'speculation' attribute is taken over from a parent thread to its child thread.

Thread manager #1 has thread sequencer 64, thread status table 65, parent thread information transfer line 70 and child thread information transfer line 71, in the same manner as thread manager #1 in FIG. 8 does. Thread status table 65 has thread status entry 66, parent thread identification entry 67 and parent thread termination determination logical unit 68, in the same manner as thread status table 19 shown in FIG. 8.

Thread manager #1 in FIG. 22 further comprises child thread status setting information transfer line 72. Child thread status setting information transfer line 72 is a one-way information transfer line with the same direction as parent thread information transfer line 70 is. Thread status table 65 in thread manager #2 in FIG. 22 further comprises child thread execution status entry 69.

The status of a thread executed by thread manager #1 is determined by receiving a signal through child thread status setting information transfer line 72 from thread manager #0. The output to thread manager #2 through child thread status setting information transfer line 72 is generated by logical OR operation on an input signal from thread manager #0 through child thread status setting information transfer line 72 and the value in child thread execution status entry 69, when parent thread identification entry 67 does not indicates that itself is the oldest thread. When it is indicated by parent thread identification entry 67 that itself is the oldest parent thread, the value in child thread execution status entry 69 is outputted as it is. When speculative thread generation instruction 49 as described in FIGS. 18 and 19 generates a child thread successfully, child thread execution status entry 69 of the thread manager is set to a speculation state. Thus, threads, generated after this child thread, all enter a speculative execution status, which continues until speculation succeeded instruction 51 is executed in the child thread.

As described above, according to the tenth embodiment of the present invention, the speculative thread generation as shown in the eight embodiment can be put into practice without missing the merits of the third embodiment.

Further, in the ninth and tenth embodiment, a cancellation function to cancel a thread execution is necessary in the thread processor. When a thread execution is canceled by speculation failure notification instruction 52 (see FIG. 19), thread status entries 60 (see FIG. 21) and 66 (see FIG. 22) have to be returned into a before-fork state from an after-fork state. Furthermore, in the embodiment, the case that the speculation attribute as shown in the eight embodiment are taken over is described, and other attributes of a parent thread also is able to be taken over to its child head, in the same manner.

As is apparent from the above description, according to the present invention, thread management can be simplified by putting thread generations and termination in the correct order and controlling the number of thread generation at most once. Therefore, the thread managers can be created with reasonable and practical integration of hardware. As a result, cost (or overhead) of thread management can be sharply decreased, and performance in a multi-processor system using fine grain of threads can be enhanced. Moreover, even when parallelism on an original problem is limited, performance can be enhanced by generating threads speculatively.

While the invention has been described in terms of several preferred embodiments, those skilled in the art will recognize that the invention can be practiced with modification within the spirit and scope of the appended claims.

What is claimed is:

1. A multi-processor system for executing a plurality of threads of instruction streams, which are provided by dividing a program into said instruction streams, wherein each of said plurality of threads is generated in response to a thread generation instruction inserted in said program and is terminated in response to a thread termination instruction inserted in said program, said system comprising:

a plurality of thread processors each for executing one of said plurality of threads, each of said plurality of thread processors generating one child thread invariably when it detects said thread generation instruction; and a thread manager for managing statuses of said plurality of thread processors and for generating an error signal when one of said plurality of thread processors tries to generate at least two child threads due to plural thread generation instructions within one thread execution, wherein each of said plurality of thread processors controls a corresponding one of said plurality of threads to generate at most one child thread and to be terminated after its parent thread, which generated said corresponding one of said plurality of threads, is terminated.

2. The multi-processor system according to claim 1, wherein said thread manager is shared with said plurality of thread processors.

3. The multi-processor system according to claim 2, wherein said thread manager comprises:

a thread status table for managing execution statuses of each of said plurality of thread processors; and a thread sequencer for controlling thread generation and termination based on said thread status table.

4. The multi-processor system according to claim 3, wherein said thread status table includes:

execution statuses;

first thread processor number entries corresponding to each of said plurality of processors; and second thread processor number entries corresponding to each of said plurality of processors, wherein one of said first thread processor number entries indicates a first identification number of the thread processor executing a first thread, which generated a second thread being executed by one of said plurality of thread processors corresponding to said one of said first thread processor number entries, and wherein each of said second thread processor number entries indicates a second identification number of the thread processor executing a third thread which said second thread generated.

5. The multi-processor system according to claim 4, wherein said thread status table further includes information indicating whether or not said third thread is being executed speculatively.

6. The multi-processor system according to claim 2, further comprising:

a thread information buffer for temporally storing information for a thread start until any one of said plurality of thread processors enters a free state.

7. The multi-processor system according to claim 1, wherein one of said plurality of threads generates a child thread, corresponding to one of said plurality of thread processors, and executes an instruction for designating attributes with respect to an operation of the child thread.

8. The multi-processor system according to claim 7, wherein each of said plurality of thread processors executes an instruction for waiting for a termination of a corresponding thread until a termination of said one of said plurality of threads which generated said corresponding thread.

9. The multi-processor system according to claim 1, wherein each of said plurality of thread processors executes a thread speculatively.

10. A multi-processor system for executing a plurality of threads of instruction streams, which are provided by dividing a program into said instruction streams, wherein each of said plurality of threads is generated in response to a thread generation instruction inserted in said program and is terminated in response to a thread termination instruction inserted in said program, said system comprising:

a plurality of thread processors for executing said plurality of threads, each of said plurality of thread processors generating one child thread invariably when it detects said thread generation instruction; and thread managers distributed to correspond to a respective one of said plurality of thread processors, for managing statuses of a corresponding one of said plurality of thread processors and for generating an error signal when one of said plurality of thread processors tries to generate at least two child threads due to plural thread generation instructions within one thread execution, wherein each of said plurality of thread processors controls a corresponding one of said plurality of threads to generate at most one thread and to be terminated after its parent thread, which generated said corresponding one of said plurality of threads, is terminated.

11. The multi-processor system according to claim 10, wherein each of said plurality of thread manager comprises:

a thread status table for managing execution statuses of a corresponding one of said plurality of thread processors; and a thread sequencer for controlling thread generation and termination in a corresponding one of said plurality of thread processors using said thread status table.

12. The multi-processor system according to claim 11, wherein:

each of said plurality of thread managers is connected to each other by a signal line for indicating whether or not the oldest thread in said multi-processor system exists in other thread processors, and each of said thread manager stores a termination of a thread into said thread status table when said signal line indicates that said oldest thread does not exist in other thread processors.

13. The multi-processor system according to claim 12, wherein said signal line has a bypass route for bypassing each of said thread managers.

14. The multi-processor system according to claim 11, wherein said thread status table includes:

execution statuses;

first thread processor number entries corresponding to each of said plurality of processors; and second thread processor number entries corresponding to each of said plurality of processors, wherein one of said first thread processor number entries indicates a first identification number of the thread processor executing a first thread, which generated a second thread being executed by one of said plurality of thread processors corresponding to said one of said first thread processor number entries, and wherein each of said second thread processor number entries indicates a second identification number of the thread processor executing a third thread which said second thread generated.

15. The multi-processor system according to claim 14, wherein said thread status table further includes information indicating whether or not said third thread is being executed speculatively.

16. The multi-processor system according to claim 10, further comprising:

a thread information buffer for temporally storing thread start information until a busy state is reset when said plurality of thread processors are all in the busy state.

* * * * *